(12) United States Patent
Chen et al.

(10) Patent No.: US 9,509,476 B2
(45) Date of Patent: Nov. 29, 2016

(54) METHOD AND DEVICE FOR DETECTING CONTROL SIGNALLING AND IMPLEMENTING CONTROL SIGNALLING DETECTION

(71) Applicant: ZTE Corporation, Shenzhen, Guangdong (CN)

(72) Inventors: Yijian Chen, Shenzhen (CN); Bo Dai, Shenzhen (CN); Zhisong Zuo, Shenzhen (CN); Jing Shi, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/430,409

(22) PCT Filed: Sep. 22, 2013

(86) PCT No.: PCT/CN2013/083949
§ 371 (c)(1),
(2) Date: Mar. 23, 2015

(87) PCT Pub. No.: WO2014/044217
PCT Pub. Date: Mar. 27, 2014

(65) Prior Publication Data
US 2015/0200759 A1 Jul. 16, 2015

(30) Foreign Application Priority Data

Sep. 24, 2012 (CN) .......................... 2012 1 0358430

(51) Int. Cl.
*H04W 4/00* (2009.01)
*H04L 5/00* (2006.01)
(Continued)

(52) U.S. Cl.
CPC .......... *H04L 5/0053* (2013.01); *H04L 27/2602* (2013.01); *H04W 24/10* (2013.01); *H04W 48/12* (2013.01); *H04W 72/042* (2013.01); *H04L 1/0035* (2013.01)

(58) Field of Classification Search
CPC . H04L 5/0053; H04L 24/10; H04L 72/2602; H04L 48/12
See application file for complete search history.

(56) References Cited

U.S. PATENT DOCUMENTS

2012/0033627 A1 2/2012 Li et al.
2012/0320846 A1* 12/2012 Papasakellariou .. H04W 72/042
370/329

(Continued)

FOREIGN PATENT DOCUMENTS

CN 101841892 A 9/2010
CN 102291736 A 12/2011

(Continued)

OTHER PUBLICATIONS

Supplementary European Search Report in European application No. 13839489.5, mailed on Dec. 22, 2015.

(Continued)

*Primary Examiner* — Abdelnabi Musa
(74) *Attorney, Agent, or Firm* — Oppedahl Patent Law Firm LLC

(57) ABSTRACT

Disclosed are a method and a device for detecting control signalling and implementing control signalling detection. In a subframe S, a terminal detects the control signalling in K ePDCCH resource sets; the terminal detects set X(i) of aggregation level of the resource in Set i of the K ePDCCH resource sets, wherein i is an integer, 0<i<=k. Detection of each ePDCCH resource set is more targeted so that detection of unreasonable aggregation level is avoided and the detection efficiency is enhanced.

17 Claims, 6 Drawing Sheets

(51) Int. Cl.
H04W 48/12 (2009.01)
H04L 27/26 (2006.01)
H04W 24/10 (2009.01)
H04W 72/04 (2009.01)
H04L 1/00 (2006.01)

(56) References Cited

U.S. PATENT DOCUMENTS

| | | | | |
|---|---|---|---|---|
| 2013/0039284 A1* | 2/2013 | Marinier | ............... | H04L 5/001 370/329 |
| 2013/0044727 A1* | 2/2013 | Nory | ............... | H04L 5/0092 370/330 |
| 2013/0250782 A1* | 9/2013 | Nimbalker | ............... | H04L 1/203 370/252 |
| 2015/0036560 A1* | 2/2015 | Kim | ............... | H04W 72/0406 370/280 |
| 2015/0215908 A1* | 7/2015 | Seo | ............... | H04L 5/0048 370/329 |

FOREIGN PATENT DOCUMENTS

| | | |
|---|---|---|
| CN | 102395206 A | 3/2012 |
| CN | 102594537 A | 7/2012 |
| JP | 2014508471 A | 4/2014 |
| WO | 2010124628 A1 | 11/2010 |
| WO | 2012109542 A1 | 8/2012 |

OTHER PUBLICATIONS

Performance Evaluation Search Space for ePDCCH , 3GPP DRAFT; RI-123552—Performance Evaluation of Search Space for ePDCCH , 3rd Generation Partnership Project (3GPP) ,Mobi Le Competence Centre 650 , Route Des Lucioles F-06921 Sophia-Antipolis Cedex ,vol. RAN WG1 , No. Qingdao , China; mailed on Aug. 17, 2012.
Consideration on UE monitoring set ,3GPP DRAFT; R1-123375 Consideration on UE Monitoring Set, 3rd Generation Partnership Project (3GPP) , Mobile Competence Centre 650 , Route Des Lucioles F-06921 Sophia-Antipolis Cedex France,vol. RAN WG15,mailed on Aug. 5, 2012.
Discussion on ePDCCH candidates and search space design,3GPP DRAFT; R1-123374 Discussion on Epdcchcandidates and Search Space Design , 3rd Generation Partnership Proj CT (3GPP) , Mobile Competence Centre 650 , Route Des Lucioles F-06921 Sophia-Antipolis,vol.RAN WG1 , No. Qingdao , China; mailed on Aug. 17, 2012.
Draft Report of 3GPP TSG RAN WG1 #70 vO.1.0 ( Qingdao, China, 13th-17th Aug. 2 , 3GPP Draftdraft ReportWG1#70_V010, 3rdgenerati on Partnership Project (3GPP), Mobile Competence Centre 650, Route Deslucioles F-06921 Sophia-Anti Poli 5 Cedex; France, vol. RAN WG1, No. San Diego, mailed on Oct. 12, 2012.
PRB indication to UE ePDCCH transmission,3GPP DRAFT; R1-123252, 3rd Generation Partnership Project (3GPP), Mobile Competence Centre 650, Route Deslucioles F-06921 Sophia-Antipolis Cedex; France, vol. RAN WG1, No. Qingdao, China; mailed on Aug. 17, 2012.
Discussion on ePDCCH candidates design, 3GPP DRAFT; R1-122106 Discussion on Candidates Design, 3rd Generation Artnership Project (3GPP), Mobile Competence Centre 650, Route Des Lucioles F-06921 Sophia-Antipolis Cedex; France, vol. RAN WG1, No. Prague, mailed on May 21, 2012.
Discussion on aggregation and BD split for ePDCCH, 3GPP DRAFT; R1-124813 Discussion on Aggregation Levels and BD Split for ePDCCH, 3rd Generation Partnership Project (3GPP), Mobile Co[同]Petence Centre 650, Route Des Lucioles F-06921 Sophia-Antipolisx, P levels, vol. RAN WG1, No. New Orleans, mailed on Nov. 12, 2012.
Remaining issues of ePDCCH Set 1-21configuration,3GPP DRAFT; R1-124814 Remaining Issues of ePDCCH Set Configuration, 3rd Generation Partnership Project (3GPP), Mobile Co[同]petence Centre 650, Route Des Lucioles F-06921 Sophia-Antipolis Cedex FRA ZTE: vol. RAN WG1, No. New Orleans, USA; mailed on Nov. 12, 2012.
International Search Report in international application No. PCT/CN2013/083949, mailed on Feb. 13, 2014.
English Translation of the Written Opinion of the International Search Authority in international application No. PCT/CN2013/083949, mailed on Feb. 13, 2014.
Texas Instruments, ePDCCH search space design and aggregation level [online], 3GPP TSG-RAN WG1#70 R1-123195, <URL:http://www.3gpp.org/ftp/tsg_ran/WG1_RL1/TSGR1_70/Docs/R1-123195.zip>, mailed on Aug. 17, 2012.
Catt, Search space design for E-PDCCH [online], 3GPP TSG-RAN WG1#70 R1-123224, <URL:http://www.3gpp.org/ftp/tsg_ran/WG1_RL1/TSGR1_70/Docs/R1-123224.zip>, mailed on Aug. 17, 2012.

* cited by examiner

Fig. 4

| PRB pair1 | PRB pair2 | PRB pair3 | PRB pair4 | PRB pair5 | PRB pair6 | PRB pair7 | PRB pair8 | PRB pair9 | PRB pair10 | PRB pair11 | PRB pair12 | PRB pair13 | PRB pair14 | PRB pair15 | PRB pair16 |

Fig. 5

| PRB pair1 | PRB pair2 | PRB pair3 | PRB pair4 | PRB pair5 | PRB pair6 | PRB pair7 | PRB pair8 | PRB pair9 | PRB pair10 | PRB pair11 | PRB pair12 | PRB pair13 | PRB pair14 | PRB pair15 | PRB pair16 |

METHOD AND DEVICE FOR DETECTING CONTROL SIGNALLING AND IMPLEMENTING CONTROL SIGNALLING DETECTION

TECHNICAL FIELD

The disclosure relates to the field of mobile communications, and in particular to a method and device for detecting control signalling and implementing control signalling detection.

BACKGROUND

In a Long Term Evolution (LTE) system and an improved LTE-Advance system, a downlink physical layer control signalling includes Downlink Grant (DL Grant) information related to downlink transmission required by a terminal (e.g., User Equipment (UE) and Uplink Grant (UL Grant) information related to uplink transmission required by the terminal, so as to indicate various kinds of information such as transmission resource location and modulation and encoding scheme or the like. The physical layer control signalling is transmitted over a Physical Downlink Control Channel (PDCCH). The physical layer control signalling mainly refers to a user-specific control signalling in a physical layer.

In Release (R) 8/9 of the LTE system and R10 of the LTE-Advance system, a physical layer control channel over which the physical layer control signalling is transmitted is generally configured in the first N Orthogonal Frequency Division Multiplexing (OFDM) symbols, and a resource region constituted by the N symbols is generally referred to as a control signalling transmission region.

Available transmission resources of the existing control signalling transmission region (a first control signalling transmission region, or referred to as a first control signalling region) are divided into multiple Control Channel Elements (CCEs), each being a resource unit. The resources occupied by the control signalling are assigned in the unit of the CCE. As a resource unit, the CCE may be subdivided into Resource Element Groups (REGs). A single CCE is constituted by multiple non-consecutive REGs. Generally, 9 REGs constitute one CCE, and each REG is constituted by multiple basic resource elements.

Private control signalling and public control signalling are transmitted in resource unit of the CCE, then mapped to the corresponding REG resources, and then mapped to Resource Elements (RE, which is the minimum resource unit) of multiple Physical Resource Pairs (PRB pairs, also referred to as PRBs for short).

The terminal generally performs blind detection in the following way: initial positions of the private control signalling and the public control signalling are calculated, wherein the private control signalling is often mainly concerned. The Aggregation Level (AL) of the blind detection and the number of the blind detections are as shown in Table 1.

TABLE 1

| Blind detection space $S_k^{(L)}$ | | | |
|---|---|---|---|
| Control signaling type | Aggregation level L | Size of blind detection space [in CCEs] | Number of blind detections $M^{(L)}$ |
| UE-specific | 1 | 6 | 6 (6/1) |
| | 2 | 12 | 6 (12/2) |
| | 4 | 8 | 2 (8/4) |
| | 8 | 16 | 2 (16/8) |
| Common | 4 | 16 | 4 (16/4) |
| | 8 | 16 | 2 (16/8) |

It can be seen from Table 1 that the transmission resources of the control signalling assigned to the user are non-consecutive, which brings many difficulties to the implementation of a closed-loop pre-coding technology in a multi-antenna system, and results in that it is possible to use a diversity technology but difficult to use the closed-loop pre-coding technology for the control signalling region.

In the release after R10, in order to improve the transmission capacity of the control channel to enable the control signalling to support more users, a new control channel region (a second control signalling transmission region, a second control signalling region) is developed, and the control signalling transmission resources for a single terminal may be consecutive time-frequency resources to support the closed-loop pre-coding technology, which improves the transmission performance of the control signalling.

The control signalling regions of the new and old releases are shown in FIG. 1. Some of the transmission resources in a Physical Downlink Shared Channel (PDSCH) transmission region in the original R8/R9/R10 may be allocated for a new control signalling transmission region, so that the transmission of the control signalling supports the closed-loop pre-coding technology, and the improvement of the control signalling capacity makes it possible to support the control signalling of more users. The control channel transmitted in the second control signalling region is referred to as the second control channel or enhanced PDCCH (ePDCCH).

The ePDCCH detection method will be introduced below in terms of resource granularity, ePDCCH candidates pilot port, transmission manner or the like.

In general, a base station first notifies the terminal of an ePDCCH resource set. The base station and the terminal may also appoint a basic resource allocation unit, and then may appoint the sizes of several occupied resources (generally the aggregation of one or more resource application units). The aggregation of N resource application units is referred to as aggregation level N. Generally, one basic resource unit enhanced CCE is defined. The eCCE has a function similar to the CCE. In the second control region, the eCCE may use the definition of the CCE or may modify the definition slightly, or may also make a new definition. The size of the eCCE may be fixed or variable. The eCCE may include a Distributed eCCE (D-eCCE) and a Localized eCCE (L-eCCE) as shown in FIGS. 2 and 3.

The control signalling may define different aggregation levels based on the eCCE, for example, the aggregation level set corresponding to the Localized transmission is {1, 2, 4, 8} or {1, 2, 4, 8, 16}, and different aggregation levels represent different resource sizes. The aggregation level set corresponding to the Distributed transmission is {1, 2, 4, 8, 16} or {1, 2, 4, 8, 16, 32}, and therefore the terminal can perform blind detection on the corresponding aggregation level pointedly.

At present, available aggregation level sets for detection may be determined according to some specific situations, as shown in Table 2 or Table 3.

TABLE 2

$N_{ECCE}$

| using normal subframes and special subframes configuration 3, 4, 8 in normal cyclic prefix subframes, with the number of REs available for ePDCCH in PRB pair meeting $n_{EPDCCH} < 104$ | | All other cases | |
|---|---|---|---|
| Localized transmission | Distributed transmission | Localized transmission | Distributed transmission |
| 2 | 2 | 1 | 1 |
| 4 | 4 | 2 | 2 |
| 8 | 8 | 4 | 4 |
| — | 16 | — | 8 |

TABLE 3

$N_{ECCE}$

| Normal subframes and special subframes, configuration 3, 4, 8, withn $n_{EPDCCH} < 104$ and using normal cyclic prefix | | All other cases | |
|---|---|---|---|
| Localized transmission | Distributed transmission | Localized transmission | Distributed transmission |
| 2 | 2 | 1 | 1 |
| 4 | 4 | 2 | 2 |
| 8 | 8 | 4 | 4 |
| 16 | 16 | 8 | 8 |
| — | 32 | — | 16 |

The base station may configure multiple ePDCCH resource sets for the terminal, each ePDCCH resource set may uniquely correspond to a type of Localized transmission (referred to as type L for short) or a type of Distributed transmission (referred to as type D for short). The type of the ePDCCH resource set and the type of the ePDCCH transmission mean the same thing. The types of the ePDCCH resource sets and the types of the ePDCCH transmissions may be Localized or Distributed. The type refers to: if it is configured to be the distributed type, only the distributed ePDCCH is transmitted or detected within the ePDCCH resource set; if it is configured to be the localized type, only the Localized ePDCCH is transmitted or detected within the ePDCCH resource set.

For example: when 3 Resource sets are configured,

The ePDCCH resource set 1 is the Localized type, the terminal detects the ePDCCH resource sets of localized type in a subframe S using a corresponding AL={1, 2, 4, 8};

The ePDCCH resource set 2 is the Distributed type, the terminal detects the ePDCCH resource sets of distributed type in a subframe S using a corresponding AL={1, 2, 4, 8, 16};

The ePDCCH resource set 3 is the Distributed type, the terminal detects the ePDCCH resource sets of distributed type in a subframe S using a corresponding AL={1, 2, 4, 8, 16}.

The AL corresponding to the case of Localized type is aggregated according to the localized eCCE, the AL corresponding to the case of Distributed type is aggregated according to the Distributed eCCE.

To sum up, the number of blind detections is increased greatly when more resource sets are configured, which limits the configuration number of the resource sets. In addition, in a case where the total number of blind detections is constant, the number of blind detections of each AL in each ePDCCH resource set is small, which results in that the effect of configuring multiple ePDCCH resource sets cannot be exploited, causing ePDCCH performance loss.

SUMMARY

In view of this, the disclosure is mainly intended to provide a method and a device for detecting control signalling and implementing control signalling detection to improve the detection efficiency.

To this end, the technical schemes of the disclosure are implemented as follows.

A method for detecting control signalling includes that:

in a subframe S, a terminal detects the control signalling in K ePDCCH resource sets; the terminal detects set X(i) of aggregation level of the resource in Set i of the K ePDCCH resource sets, wherein i is an integer, 0<i<=k.

When K is an integer of more than 1, in the subframe S, X(i) is consecutive partial or full ALs in all of available ALs corresponding to the type of Set i, and at least one X(i) is the consecutive partial ALs in all of available AL sets;

in the subframe S, the available AL set corresponding to the ePDCCH resource set of a Localized type is {1, 2, 4}, and the available AL set corresponding to the ePDCCH resource set of a Distributed type is {1, 2, 4, 8};

or, in the subframe S, the available AL set corresponding to the ePDCCH resource set of the Localized type is {1, 2, 4, 8}, and the available AL set corresponding to the ePDCCH resource set of the Distributed type is {1, 2, 4, 8, 16};

or, in the subframe S, the available AL set corresponding to the ePDCCH resource set of the Localized type is {2, 4, 8}, and the available AL set corresponding to the ePDCCH resource set of the Distributed type is {2, 4, 8, 16};

or, in the subframe S, the available AL set corresponding to the ePDCCH resource set of the Localized type is {2, 4, 8, 16}, and the available AL set corresponding to the ePDCCH resource set of the Distributed type is {2, 4, 8, 16, 32};

the aggregation level sets to be detected corresponding to multiple Sets have no intersections or have intersections including one AL or intersections including 2 ALs;

the AL set corresponding to Set is as shown in the following table:

| AL sets corresponding to all Localized transmissions | AL sets corresponding to all Distributed transmissions |
|---|---|
| 1, 2, 4 | 8 |
| 1, 2, | 4, 8 |
| 2, 4 | 8, 16 |
| 2, 4, 8 | 16 |
| 1, 2, 4 | 8, 16 |
| 1, 2, | 4, 8, 16 |
| 2, 4, 8 | 16, 32 |
| 2, 4, | 8, 16, 32 |
| 1, 2, 4 | 4, 8 |
| 1, 2, 4 | 2, 4, 8 |
| 1, 2, | 2, 4, 8 |
| 2, 4 | 4, 8, 16 |
| 2, 4, 8 | 8, 16 |
| 2, 4, 8 | 4, 8, 16 |
| 1, 2, 4 | 8, 16 |
| 1, 2, | 4, 8, 16 |
| 1, 2, 4 | 4, 8, 16 |
| 2, 4, 8 | 16, 32 |
| 2, 4, 8 | 8, 16, 32 |

-continued

| AL sets corresponding to all Localized transmissions | AL sets corresponding to all Distributed transmissions |
|---|---|
| 2, 4, | 8, 16, 32 |
| 2, 4, 8, 16 | 32 |
| 2, 4, 8, 16 | 16, 32 |
| 2, 4, 8, 16 | 8, 16, 32 |

When K is an integer of more than 1, and ePDCCH resource sets of a same type exist, the aggregation levels to be detected corresponding to multiple ePDCCH resource sets of the ePDCCH transmission type in the same ePDCCH resource set are different; and the aggregation levels to be detected corresponding to multiple ePDCCH resource sets of a type of the same ePDCCH resource set have no intersections or have intersections including one AL;

any one of the aggregation levels in the AL set corresponding to type D is more than or equal to the maximum aggregation level in the AL set corresponding to type L;

the case that 2 ePDCCH resource sets are of type L is as shown in the following table:

| AL set corresponding to one Localized ePDCCH resource set | AL set corresponding to another Localized ePDCCH resource set |
|---|---|
| 1, 2, 4 | 8 |
| 1, 2 | 4, 8 |
| 1, 2, 4 | 4, 8 |
| 1 | 2, 4, 8 |
| 1, 2, 4 | 2, 4, 8 |
| 2, 4, 8 | 16 |
| 2, 4 | 8, 16 |
| 2, 4, 8 | 8, 16 |
| 2 | 4, 8, 16 |
| 2, 4, 8 | 4, 8, 16 | the case that 2 ePDCCH resource sets are of type D is as shown in the following table:

| AL set corresponding to one Localized ePDCCH resource set | AL set corresponding to another Localized ePDCCH resource set |
|---|---|
| 1, 2, 4, 8 | 16 |
| 1, 2, 4 | 8, 16 |
| 1, 2 | 4, 8, 16 |
| 1 | 2, 4, 8, 16 |
| 1, 2, 4 | 4, 8, 16 |
| 1, 2, 4, 8 | 8, 16 |
| 1, 2, 4, 8 | 4, 8, 16 |
| 1, 2, 4, 8 | 2, 4, 8, 16 |
| 2, 4, 8, 16 | 32 |
| 2, 4, 8 | 16, 32 |
| 2, 4 | 8, 16, 32 |
| 2 | 4, 8, 16, 32 |
| 2, 4, 8 | 8, 16, 32 |
| 2, 4, 8, 16 | 16, 32 |
| 2, 4, 8, 16 | 8, 16, 32 |
| 2, 4, 8, 16 | 4, 8, 16, 32 |

X(i) is determined according to at least one of the following items or all of the following items:

(a) the number N of Physical Resource Block (PRB) pairs corresponding to Set i;

(b) the type of Set i;

(c) the PRB indexes of the PRB pairs included in Set i;

(d) aggregation level configuration signalling of the base station with respect to the ePDCCH resource set;

(e) the ePDCCH transmission type of ePDCCH resource set;

(f) a K value and an index i of the ePDCCH resource set; and (g) the number of enhanced Resource Element Group (eREG) included in an enhanced Control Channel Element (eCCE).

When X(i) is determined according to several of (a) to (g),

X(i) is determined according to at least the number N of the PRB pairs corresponding to Set i and the number of eREGs included in the eCCE; or X(i) is determined according to at least the value of the number N of the PRB pairs corresponding to Set i and the number of eREGs included in the eCCE; or X(i) is determined according to at least the type of the ePDCCH transmission of Set i and the number of eREGs included in the eCCE; or X(i) is determined according to at least the PRB indexes of the PRB pairs included in Set i and the number of eREGs included in the eCCE; or X(i) is determined according to at least the aggregation level configuration signalling of the base station and the number of eREGs included in the eCCE; or X(i) is determined according to at least the type of the ePDCCH transmission of Set i, K value and index i of the ePDCCH resource set and the number of eREGs included in the eCCE; or X(i) is determined according to at least K value and index i of the ePDCCH resource set and the number of eREGs included in the eCCE; or X(i) is determined according to at least N value corresponding to Set i and the ePDCCH transmission type of Set i; or X(i) is determined according to at least N value corresponding to Set i and the PRB indexes of the PRB pairs included in Set i; or X(i) is determined according to at least N value corresponding to Set i and the aggregation level configuration signalling of the base station with respect to the ePDCCH resource set; or X(i) is determined according to at least N value corresponding to Set i, the ePDCCH transmission type of K ePDCCH resource sets, K value and index i; or X(i) is determined according to at least N value corresponding to Set i, the ePDCCH transmission type of K ePDCCH resource sets, and index i; or X(i) is determined according to at least N value corresponding to Set i, K value and index i; or X(i) is determined according to at least N value corresponding to Set i, K value and index i, and the ePDCCH transmission type of Set i and the PRB indexes of the PRB pairs included in Set i; or X(i) is determined according to at least N value corresponding to Set i, K value and index i, and the ePDCCH transmission type of Set i and the aggregation level configuration signalling of the base station with respect to the ePDCCH resource set; or X(i) is determined according to at least the ePDCCH transmission type of K ePDCCH resource sets, index i, the ePDCCH transmission type of Set i and the aggregation level configuration signalling of the base station with respect to the ePDCCH resource set; or X(i) is determined according to at least the ePDCCH transmission type of Set i, index i and K value; or X(i) is determined according to at least the aggregation level configuration signalling of the base station with respect to the ePDCCH resource set, the PRB indexes of the PRB pairs included in Set i; or X(i) is determined according to at least the PRB indexes of the PRB pairs included in Set i, index i and the ePDCCH transmission type of K ePDCCH resource sets; or X(i) is determined according to at least the PRB indexes of the PRB pairs included in Set i, K value and index i; or X(i) is determined according to at least the aggregation level configuration signalling of the base station with respect to the ePDCCH resource set, the ePDCCH transmission type of K ePDCCH resource sets; or X(i) is determined according to at least the aggregation level configuration signalling of the base station with respect to the ePDCCH resource set, K value and index i; or X(i) is determined according to at least the value of the number N of the PRB pairs corresponding to Set i, the ePDCCH transmission type of Set i and the PRB indexes of the PRB pairs included in Set i; or X(i) is determined according to at least the value of the number N of the PRB pairs corresponding to Set i, the ePDCCH transmission type of Set i and the aggregation level configuration signalling of the base station with respect to the ePDCCH resource set; or X(i) is determined according to at least the value of the number N of the PRB pairs corresponding to Set i, the ePDCCH transmission type of Set i and K value and index i; or X(i) is determined according to at least the value of the number N of the PRB pairs corresponding to Set i, the ePDCCH transmission type of Set i and the ePDCCH transmission type of K ePDCCH resource sets and index i; or X(i) is determined according to at least the value of the number N of the PRB pairs corresponding to Set i, the ePDCCH transmission type of Set i and the PRB indexes of the PRB pairs included in Set i; or X(i) is determined according to at least the value of the number N of the PRB pairs corresponding to Set i, the ePDCCH transmission type of Set i, the PRB indexes of the PRB pairs included in Set i, and the aggregation level configuration signalling of the base station with respect to the ePDCCH resource set; or X(i) is determined according to at least the value of the number N of the PRB pairs corresponding to Set i, the ePDCCH transmission type of Set i, the PRB indexes of the PRB pairs included in Set i, the ePDCCH transmission type of K ePDCCH resource sets and index i; or X(i) is determined according to at least the value of the number N of the PRB pairs corresponding to Set i, the ePDCCH transmission type of Set i, the PRB indexes of the PRB pairs included in Set i, K value and index i; or X(i) is determined according to at least the value of the number N of the PRB pairs corresponding to Set i, the ePDCCH transmission type of Set i, the PRB indexes of the PRB pairs included in Set i, the aggregation level configuration signalling of the base station with respect to the ePDCCH resource set, K value and index i; or X(i) is determined according to at least the value of the number N of the PRB pairs corresponding to Set i, the ePDCCH transmission type of Set i, the PRB indexes of the PRB pairs included in Set i, the ePDCCH transmission type of K ePDCCH resource sets, K value and index i; or X(i) is determined according to at least the value of the number N of the PRB pairs corresponding to Set i, the ePDCCH transmission type of Set i, the PRB indexes of the PRB pairs included in Set i, the aggregation level configuration signalling of the base station with respect to the ePDCCH resource set, the ePDCCH transmission type of K ePDCCH resource sets, K value and index i.

When X(i) is determined, the number of eREGs included in the eCCE is taken into account; or when X(i) is determined, a DCI Format to be detected is taken into account; or when X(i) is determined, the type of the subframe and/or one of the following three items are taken into account to make a determination: a coding rate corresponding to the DCI Format to be detected transmitted in the subframe S, the number of Resource Elements (REs) available for transmitting the ePDCCH in the PRB pair in the subframe S, and the number of REs available for transmitting the ePDCCH in the eCCE in the subframe S.

A device for detecting control signalling is configured to:

in a subframe S, detect the control signalling in K enhanced Physical Downlink Control Channel (ePDCCH) resource sets; detect set X(i) of aggregation level of the resource in Set i of the K ePDCCH resource sets, wherein i is an integer, $0 < i <= k$.

When K is an integer of more than 1, in the subframe S, X(i) is consecutive partial or full ALs in all of available ALs corresponding to the type of Set i, and at least one X(i) is the consecutive partial ALs in all of available AL sets;

in the subframe S, the available AL set corresponding to the ePDCCH resource set of a Localized type is {1, 2, 4}, and the available AL set corresponding to the ePDCCH resource set of a Distributed type is {1, 2, 4, 8};

or, in the subframe S, the available AL set corresponding to the ePDCCH resource set of the Localized type is {1, 2, 4, 8}, and the available AL set corresponding to the ePDCCH resource set of the Distributed type is {1, 2, 4, 8, 16};

or, in the subframe S, the available AL set corresponding to the ePDCCH resource set of the Localized type is {2, 4, 8}, and the available AL set corresponding to the ePDCCH resource set of the Distributed type is {2, 4, 8, 16};

or, in the subframe S, the available AL set corresponding to the ePDCCH resource set of the Localized type is {2, 4, 8, 16}, and the available AL set corresponding to the ePDCCH resource set of the Distributed type is {2, 4, 8, 16, 32};

the aggregation level sets to be detected corresponding to multiple Sets have no intersections or have intersections including one AL or intersections including 2 ALs;

the AL set corresponding to Set is as shown in the following table:

TABLE 5

| AL sets corresponding to all Localized transmissions | AL sets corresponding to all Distributed transmissions |
|---|---|
| 1, 2, 4 | 8 |
| 1, 2, | 4, 8 |
| 2, 4 | 8, 16 |
| 2, 4, 8 | 16 |
| 1, 2, 4 | 8, 16 |
| 1, 2, | 4, 8, 16 |
| 2, 4, 8 | 16, 32 |
| 2, 4, | 8, 16, 32 |
| 1, 2, 4 | 4, 8 |
| 1, 2, 4 | 2, 4, 8 |
| 1, 2, | 2, 4, 8 |
| 2, 4 | 4, 8, 16 |
| 2, 4, 8 | 8, 16 |
| 2, 4, 8 | 4, 8, 16 |
| 1, 2, 4 | 8, 16 |
| 1, 2, | 4, 8, 16 |
| 1, 2, 4 | 4, 8, 16 |
| 2, 4, 8 | 16, 32 |
| 2, 4, 8 | 8, 16, 32 |
| 2, 4, | 8, 16, 32 |
| 2, 4, 8, 16 | 32 |

TABLE 5-continued

| AL sets corresponding to all Localized transmissions | AL sets corresponding to all Distributed transmissions |
|---|---|
| 2, 4, 8, 16 | 16, 32 |
| 2, 4, 8, 16 | 8, 16, 32 |

When K is an integer of more than 1, and multiple ePDCCH resource sets of a same type (type L or type D) exist, the aggregation levels to be detected corresponding to multiple ePDCCH resource sets of the same ePDCCH transmission type (type L or type D) are different;

the aggregation levels to be detected corresponding to multiple ePDCCH resource sets of a type of the same ePDCCH resource set have no intersections or have intersections including one AL;

any one of the aggregation levels in the AL set corresponding to type D is more than or equal to the maximum aggregation level in the AL set corresponding to type L;

the case that 2 ePDCCH resource sets are of type L is as shown in the following table:

| AL set corresponding to one Localized ePDCCH resource set | AL set corresponding to another Localized ePDCCH resource set |
|---|---|
| 1, 2, 4 | 8 |
| 1, 2 | 4, 8 |
| 1, 2, 4 | 4, 8 |
| 1 | 2, 4, 8 |
| 1, 2, 4 | 2, 4, 8 |
| 2, 4, 8 | 16 |
| 2, 4 | 8, 16 |
| 2, 4, 8 | 8, 16 |
| 2 | 4, 8, 16 |
| 2, 4, 8 | 4, 8, 16 | the case that 2 ePDCCH resource sets are of type D is as shown in the following table:

| AL set corresponding to one Localized ePDCCH resource set | AL set corresponding to another Localized ePDCCH resource set |
|---|---|
| 1, 2, 4, 8 | 16 |
| 1, 2, 4 | 8, 16 |
| 1, 2 | 4, 8, 16 |
| 1 | 2, 4, 8, 16 |
| 1, 2, 4 | 4, 8, 16 |
| 1, 2, 4, 8 | 8, 16 |
| 1, 2, 4, 8 | 4, 8, 16 |
| 1, 2, 4, 8 | 2, 4, 8, 16 |
| 2, 4, 8, 16 | 32 |
| 2, 4, 8 | 16, 32 |
| 2, 4 | 8, 16, 32 |
| 2 | 4, 8, 16, 32 |
| 2, 4, 8 | 8, 16, 32 |
| 2, 4, 8, 16 | 16, 32 |
| 2, 4, 8, 16 | 8, 16, 32 |
| 2, 4, 8, 16 | 4, 8, 16, 32 |

X(i) is determined according to at least one of the following items or all of the following items:

(a) the number N of Physical Resource Block (PRB) pairs corresponding to Set i;

(b) the type of Set i;

(c) the PRB indexes of the PRB pairs included in Set i;

(d) aggregation level configuration signalling of the base station with respect to the ePDCCH resource set;

(e) the ePDCCH transmission type of ePDCCH resource set;

(f) a K value and an index i of the ePDCCH resource set; and (g) the number of enhanced Resource Element Group (eREG) included in an enhanced Control Channel Element (eCCE).

When X(i) is determined according to several of (a) to (g), the device is configured to:

determine X(i) according to at least the number N of the PRB pairs corresponding to Set i and the number of eREGs included in the eCCE; or determine X(i) according to at least the value of the number N of the PRB pairs corresponding to Set i and the number of eREGs included in the eCCE; or determine X(i) according to at least the type of the ePDCCH transmission of Set i and the number of eREGs included in the eCCE; or determine X(i) according to at least the PRB indexes of the PRB pairs included in Set i and the number of eREGs included in the eCCE; or determine X(i) according to at least the aggregation level configuration signalling of the base station and the number of eREGs included in the eCCE; or determine X(i) according to at least the type of the ePDCCH transmission of Set i, K value and index i of the ePDCCH resource set and the number of eREGs included in the eCCE; or determine X(i) according to at least K value and index i of the ePDCCH resource set and the number of eREGs included in the eCCE; or determine X(i) according to at least N value corresponding to Set i and the ePDCCH transmission type of Set i; or determine X(i) according to at least N value corresponding to Set i and the PRB indexes of the PRB pairs included in Set i; or determine X(i) according to at least N value corresponding to Set i and the aggregation level configuration signalling of the base station with respect to the ePDCCH resource set; or determine X(i) according to at least N value corresponding to Set i, the ePDCCH transmission type of K ePDCCH resource sets, K value and index i; or determine X(i) according to at least N value corresponding to Set i, the ePDCCH transmission type of K ePDCCH resource sets, and index i; or determine X(i) according to at least N value corresponding to Set i, K value and index i; or determine X(i) according to at least N value corresponding to Set i, K value and index i, and the ePDCCH transmission type of Set i and the PRB indexes of the PRB pairs included in Set i; or determine X(i) according to at least N value corresponding to Set i, K value and index i, and the ePDCCH transmission type of Set i and the aggregation level configuration signalling of the base station with respect to the ePDCCH resource set; or determine X(i) according to at least the ePDCCH transmission type of K ePDCCH resource sets, index i, the ePDCCH transmission type of Set i and the aggregation level configuration signalling of the base station with respect to the ePDCCH resource set; or determine X(i) according to at least the ePDCCH transmission type of Set i, index i and K value; or determine X(i) according to at least the aggregation level configuration signalling of the base station with respect to the ePDCCH resource set, the PRB indexes of the PRB pairs included in Set i; or determine X(i) according to at least the PRB indexes of the PRB pairs included in Set i, index i and the ePDCCH transmission type of K ePDCCH resource sets; or determine X(i) according to at least the PRB indexes of the PRB pairs included in Set i, K value and index i; or determine X(i) according to at least the aggregation level configuration signalling of the base station with respect to the ePDCCH resource set, the ePDCCH transmission type of K ePDCCH resource sets; or determine X(i) according to at least the aggregation level configuration signalling of the base station with respect to the ePDCCH resource set, K value and index i; or determine X(i) according to at least the value of the number N of the PRB pairs corresponding to Set i, the ePDCCH transmission type of Set i and the PRB indexes of the PRB pairs included in Set i; or determine X(i) according to at least the value of the number N of the PRB pairs corresponding to Set i, the ePDCCH transmission type of Set i and the aggregation level configuration signalling of the base station with respect to the ePDCCH resource set; or determine X(i) according to at least the value of the number N of the PRB pairs corresponding to Set i, the ePDCCH transmission type of Set i and K value and index i; or determine X(i) according to at least the value of the number N of the PRB pairs corresponding to Set i, the ePDCCH transmission type of Set i and the ePDCCH transmission type of K ePDCCH resource sets and index i; or determine X(i) according to at least the value of the number N of the PRB pairs corresponding to Set i, the ePDCCH transmission type of Set i and the PRB indexes of the PRB pairs included in Set i; or determine X(i) according to at least the value of the number N of the PRB pairs corresponding to Set i, the ePDCCH transmission type of Set i, the PRB indexes of the PRB pairs included in Set i, and the aggregation level configuration signalling of the base station with respect to the ePDCCH resource set; or determine X(i) according to at least the value of the number N of the PRB pairs corresponding to Set i, the ePDCCH transmission type of Set i, the PRB indexes of the PRB pairs included in Set i, the ePDCCH transmission type of K ePDCCH resource sets and index i; or determine X(i) according to at least the value of the number N of the PRB pairs corresponding to Set i, the ePDCCH transmission type of Set i, the PRB indexes of the PRB pairs included in Set i, K value and index i; or determine X(i) according to at least the value of the number N of the PRB pairs corresponding to Set i, the ePDCCH transmission type of Set i, the PRB indexes of the PRB pairs included in Set i, the aggregation level configuration signalling of the base station with respect to the ePDCCH resource set, K value and index i; or determine X(i) according to at least the value of the number N of the PRB pairs corresponding to Set i, the ePDCCH transmission type of Set i, the PRB indexes of the PRB pairs included in Set i, the ePDCCH transmission type of K ePDCCH resource sets, K value and index i; or determine X(i) according to at least the value of the number N of the PRB pairs corresponding to Set i, the ePDCCH transmission type of Set i, the PRB indexes of the PRB pairs included in Set i, the aggregation level configuration signalling of the base station with respect to the ePDCCH resource set, the ePDCCH transmission type of K ePDCCH resource sets, K value and index i.

The device is configured to:

when X(i) is determined, take into account the number of eREGs included in the eCCE; and/or when X(i) is determined, take into account a DCI Format to be detected; and/or when X(i) is determined, take into account the type of the subframe and/or one of the following three items to make a determination: a coding rate corresponding to the DCI Format to be detected transmitted in the subframe S, the number of Resource Elements (REs) available for transmitting the ePDCCH in the PRB pair in the subframe S, and the number of REs available for transmitting the ePDCCH in the eCCE in the subframe S.

The device is a terminal.

A method for implementing control signalling detection includes that:

a base station notifies information of AL to be detected corresponding to K ePDCCH resource sets Set i through signalling.

The base station performs joint encoding on K value, the number N of PRB pairs corresponding to K Sets and AL information that each Set requires to detect, and makes a notification; or the base station performs joint encoding on K value, D/L type of K Sets, and the AL information that each Set requires to detect, and makes a notification; or the base station performs joint encoding on K value, D/L type of K Sets, the number N of PRB pairs corresponding to K Sets, and the AL information that each Set requires to detect, and makes a notification.

There are two types of subframes S, respectively a first type of subframe and a second type of subframe, the notification is made independently with respect to the two types of subframes; the first type of subframe is a subframe including 4 eREGs in one eCCE; the second type of subframe is a subframe including 8 eREGs in one eCCE.

The method further includes that:

the base station performs joint encoding on the value of the number N of PRB pairs corresponding to Set i and AL information to be detected, and makes a notification; or the base station performs joint encoding on the D/L type of Set i and the AL information to be detected, and makes a notification; or the base station performs joint encoding on the D/L type of Set i, the value of the number N of PRB pairs corresponding to Set i and AL information to be detected, and makes a notification.

A device for implementing control signalling detection is configured to:

notify information of AL to be detected corresponding to K ePDCCH resource sets Set i through signalling.

The device is configured to:

perform joint encoding on K value, the number N of PRB pairs corresponding to K Sets and AL information that each Set requires to detect, and make a notification; or perform joint encoding on K value, D/L type of K Sets, and the AL information that each Set requires to detect, and make a notification; or perform joint encoding on K value, D/L type of K Sets, the number N of PRB pairs corresponding to K Sets, and the AL information that each Set requires to detect, and makes a notification.

The AL to be detected is associated with the eCCE, the eCCE includes 4 eREGs or 8 eREGs.

The device is further configured to:

perform joint encoding on the value of the number N of PRB pairs corresponding to Set i and AL information to be detected, and make a notification; or perform joint encoding on the D/L type of Set i and the AL information to be detected, and make a notification; or perform joint encoding on the D/L type of Set i, the value of the number N of PRB pairs corresponding to Set i and AL information to be detected, and make a notification.

According to the embodiments of the disclosure, detection of each ePDCCH resource set is more targeted so that detection of unreasonable aggregation level is avoided and the detection efficiency is enhanced.

BRIEF DESCRIPTION OF THE DRAWINGS

FIG. 4 is a structural diagram when all of PRB Indexes in a PRB are non-consecutive according to an embodiment of the disclosure;

FIG. 5 is a structural diagram when every two PRB Indexes in a PRB are consecutive according to an embodiment of the disclosure.

DETAILED DESCRIPTION

Figure 1:
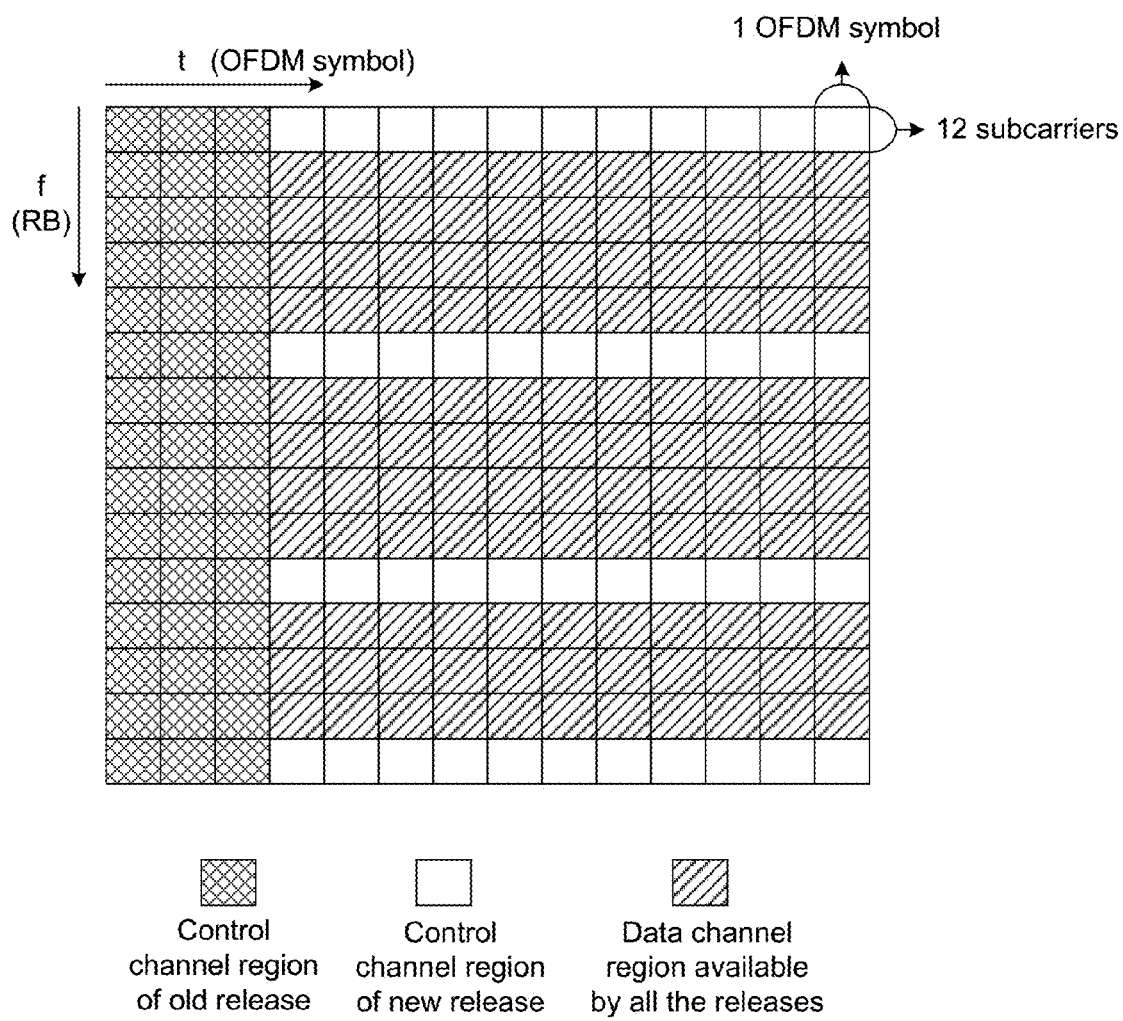
FIG. 1 is a diagram of a control signalling region of new and old release.
Figure 2:
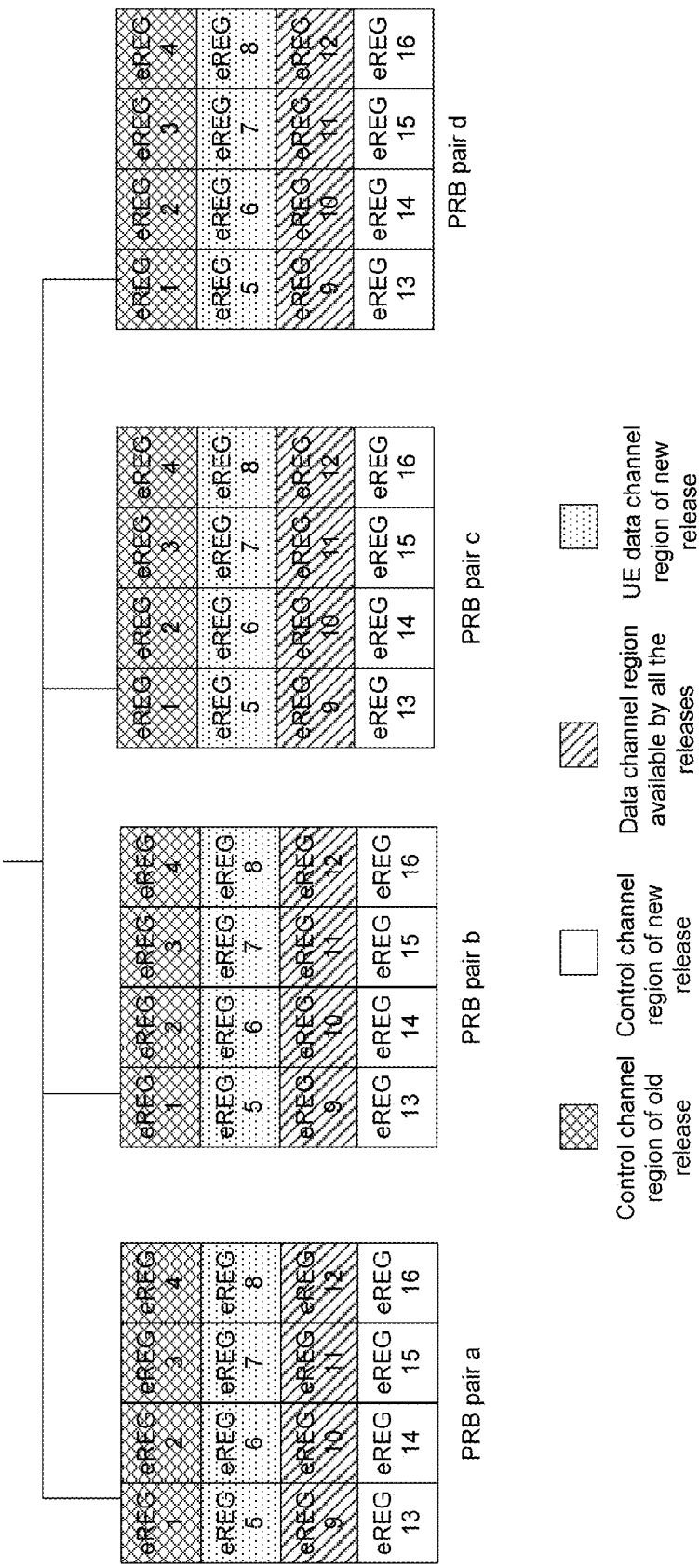
FIG. 2 is a structural diagram of a D-eCCE.
Figure 3:
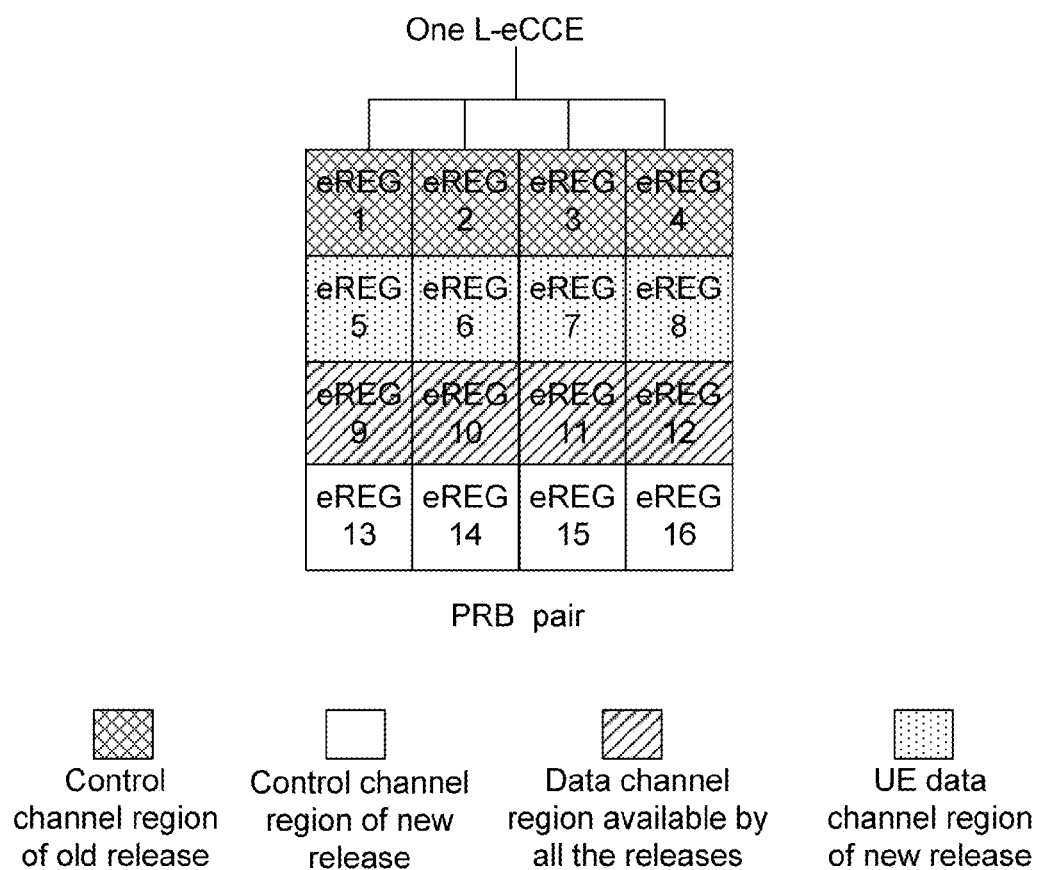
FIG. 3 is a structural diagram of an L-eCCE.

In practical applications, in a subframe S, a terminal may detect control signalling in K ePDCCH resource sets; the terminal may also perform the control signalling detection in ePDCCH resource set Set i of the K ePDCCH resource sets according to aggregation levels (AL) included in a corresponding resource AL set X(i), wherein i is an integer, and 0<i<=K. the K ePDCCH resource sets are generally configured by the base station for the terminal.

Specifically, when K is an integer more than 1, in the subframe S, X(i) may be consecutive partial or all ALs in all available ALs corresponding to the type (Localized or Distributed) of Set i, and at least one X(i) is consecutive partial ALs in all available AL sets.

Further, in the subframe S, the available AL set corresponding to the ePDCCH resource set of a Localized type is {1, 2, 4}, and the available AL set corresponding to the ePDCCH resource set of a Distributed type is {1, 2, 4, 8};

or, in the subframe S, the available AL set corresponding to the ePDCCH resource set of the Localized type is {1, 2, 4, 8}, and the available AL set corresponding to the ePDCCH resource set of the Distributed type is {1, 2, 4, 8, 16};

or, in the subframe S, the available AL set corresponding to the ePDCCH resource set of the Localized type is {2, 4, 8}, and the available AL set corresponding to the ePDCCH resource set of the Distributed type is {2, 4, 8, 16};

or, in the subframe S, the available AL set corresponding to the ePDCCH resource set of the Localized type is {2, 4, 8, 16}, and the available AL set corresponding to the ePDCCH resource set of the Distributed type is {2, 4, 8, 16, 32}.

Further, the aggregation level sets to be detected corresponding to multiple Sets have no intersections or have an intersection of one AL or intersections of 2 ALs.

Further,

TABLE 5

| AL sets corresponding to all Localized Sets | AL sets corresponding to all Distributed Sets |
| --- | --- |
| 1, 2, 4 | 8 |
| 1, 2, | 4, 8 |
| 2, 4 | 8, 16 |
| 2, 4, 8 | 16 |
| 1, 2, 4 | 8, 16 |
| 1, 2, | 4, 8, 16 |
| 2, 4, 8 | 16, 32 |
| 2, 4, | 8, 16, 32 |
| 1, 2, 4 | 4, 8 |
| 1, 2, 4 | 2, 4, 8 |
| 1, 2, | 2, 4, 8 |
| 2, 4 | 4, 8, 16 |
| 2, 4, 8 | 8, 16 |
| 2, 4, 8 | 4, 8, 16 |
| 1, 2, 4 | 8, 16 |
| 1, 2, | 4, 8, 16 |
| 1, 2, 4 | 4, 8, 16 |
| 2, 4, 8 | 16, 32 |
| 2, 4, 8 | 8, 16, 32 |
| 2, 4, | 8, 16, 32 |
| 2, 4, 8, 16 | 32 |
| 2, 4, 8, 16 | 16, 32 |
| 2, 4, 8, 16 | 8, 16, 32 |

When K is an integer of more than 1, and the ePDCCH resource set of the same type (type L or type D) exists, the aggregation levels to be detected corresponding to multiple ePDCCH resource sets of the ePDCCH transmission type (type L or type D) in the same ePDCCH resource set are different;

further, the aggregation levels to be detected corresponding to multiple ePDCCH resource sets of a type of the same ePDCCH resource set have no intersections or have intersections including one AL;

further, any one of the aggregation levels in the AL set corresponding to type D is more than or equal to the maximum aggregation level in the AL set corresponding to type L;

further, for the case that 2 ePDCCH resource sets are of type L

TABLE 6

| AL set corresponding to one Localized ePDCCH resource set | AL set corresponding to another Localized ePDCCH resource set |
| --- | --- |
| 1, 2, 4 | 8 |
| 1, 2 | 4, 8 |
| 1, 2, 4 | 4, 8 |
| 1 | 2, 4, 8 |
| 1, 2, 4 | 2, 4, 8 |
| 2, 4, 8 | 16 |
| 2, 4 | 8, 16 |
| 2, 4, 8 | 8, 16 |
| 2 | 4, 8, 16 |
| 2, 4, 8 | 4, 8, 16 |

Further, for the case that 2 ePDCCH resource sets are of type D:

TABLE 7

| AL set corresponding to one Localized ePDCCH resource set | AL set corresponding to another Localized ePDCCH resource set |
| --- | --- |
| 1, 2, 4, 8 | 16 |
| 1, 2, 4 | 8, 16 |

TABLE 7-continued

| AL set corresponding to one Localized ePDCCH resource set | AL set corresponding to another Localized ePDCCH resource set |
|---|---|
| 1, 2 | 4, 8, 16 |
| 1 | 2, 4, 8, 16 |
| 1, 2, 4 | 4, 8, 16 |
| 1, 2, 4, 8 | 8, 16 |
| 1, 2, 4, 8 | 4, 8, 16 |
| 1, 2, 4, 8 | 2, 4, 8, 16 |
| 2, 4, 8, 16 | 32 |
| 2, 4, 8 | 16, 32 |
| 2, 4 | 8, 16, 32 |
| 2 | 4, 8, 16, 32 |
| 2, 4, 8 | 8, 16, 32 |
| 2, 4, 8, 16 | 16, 32 |
| 2, 4, 8, 16 | 8, 16, 32 |
| 2, 4, 8, 16 | 4, 8, 16, 32 |

X(i) may be determined according to at least one of the following items:
  (a) the number N of Physical Resource Block (PRB) pairs corresponding to Set i;
  (b) the type (type L or type D) of Set i;
  (c) the PRB indexes of the PRB pairs included in Set i;
  (d) aggregation level configuration signalling of the base station with respect to the ePDCCH resource set;
  (e) the ePDCCH transmission type of ePDCCH resource set;
  (f) a K value and an index i of the ePDCCH resource set; and
  (g) the number of eREG included in an eCCE; and
  (h) the detected DCI Format.

Of course, X(i) may also be determined according to several of (a) to (g). For example:
  X(i) is determined according to at least the number N of the PRB pairs corresponding to Set i and the number of eREGs included in the eCCE; or
  X(i) is determined according to at least the value of the number N of the PRB pairs corresponding to Set i and the number of eREGs included in the eCCE; or
  X(i) is determined according to at least the type (type L or type D) of the ePDCCH transmission of Set i and the number of eREGs included in the eCCE; or
  X(i) is determined according to at least the PRB indexes of the PRB pairs included in Set i and the number of eREGs included in the eCCE; or
  X(i) is determined according to at least the aggregation level configuration signalling of the base station and the number of eREGs included in the eCCE; or
  X(i) is determined according to at least the type (type L or type D) of the ePDCCH transmission of Set i, K value and index i of the ePDCCH resource set and the number of eREGs included in the eCCE; or
  X(i) is determined according to at least K value and index i of the ePDCCH resource set and the number of eREGs included in the eCCE; or
  X(i) is determined according to at least N value corresponding to Set i and the type (type L or type D) of ePDCCH transmission of Set i; or
  X(i) is determined according to at least N value corresponding to Set i and the PRB indexes of the PRB pairs included in Set i; or
  X(i) is determined according to at least N value corresponding to Set i and the aggregation level configuration signalling of the base station with respect to the ePDCCH resource set; or
  X(i) is determined according to at least N value corresponding to Set i, the ePDCCH transmission type of K ePDCCH resource sets, K value and index i; or
  X(i) is determined according to at least N value corresponding to Set i, the ePDCCH transmission type of K ePDCCH resource sets, and index i; or
  X(i) is determined according to at least N value corresponding to Set i, K value and index i; or
  X(i) is determined according to at least N value corresponding to Set i, K value and index i, and the type (type L or type D) of ePDCCH transmission of Set i and the PRB indexes of the PRB pairs included in Set i; or
  X(i) is determined according to at least N value corresponding to Set i, K value and index i, and the type (type L or type D) of ePDCCH transmission of Set i and the aggregation level configuration signalling of the base station with respect to the ePDCCH resource set; or
  X(i) is determined according to at least the ePDCCH transmission type of K ePDCCH resource sets, index i, the type (type L or type D) of ePDCCH transmission of Set i and the aggregation level configuration signalling of the base station with respect to the ePDCCH resource set; or
  X(i) is determined according to at least the type (type L or type D) of ePDCCH transmission of Set i, index i and K value; or
  X(i) is determined according to at least the aggregation level configuration signalling of the base station with respect to the ePDCCH resource set, the PRB indexes of the PRB pairs included in Set i; or
  X(i) is determined according to at least the PRB indexes of the PRB pairs included in Set i, index i and the ePDCCH transmission type of K ePDCCH resource sets; or
  X(i) is determined according to at least the PRB indexes of the PRB pairs included in Set i, K value and index i; or
  X(i) is determined according to at least the aggregation level configuration signalling of the base station with respect to the ePDCCH resource set, the ePDCCH transmission type of K ePDCCH resource sets; or
  X(i) is determined according to at least the aggregation level configuration signalling of the base station with respect to the ePDCCH resource set, K value and index i; or
  X(i) is determined according to at least the value of the number N of the PRB pairs corresponding to Set i, the type (type L or type D) of ePDCCH transmission of Set i and the PRB indexes of the PRB pairs included in Set i; or
  X(i) is determined according to at least the value of the number N of the PRB pairs corresponding to Set i, the type (type L or type D) of ePDCCH transmission of Set i and the aggregation level configuration signalling of the base station with respect to the ePDCCH resource set; or
  X(i) is determined according to at least the value of the number N of the PRB pairs corresponding to Set i, the type (type L or type D) of ePDCCH transmission of Set i and K value and index i; or
  X(i) is determined according to at least the value of the number N of the PRB pairs corresponding to Set i, the type (type L or type D) of ePDCCH transmission of Set i and the ePDCCH transmission type of K ePDCCH resource sets and index i; or
  X(i) is determined according to at least the value of the number N of the PRB pairs corresponding to Set i, the type (type L or type D) of ePDCCH transmission of Set i and the PRB indexes of the PRB pairs included in Set i; or
  X(i) is determined according to at least the value of the number N of the PRB pairs corresponding to Set i, the type (type L or type D) of ePDCCH transmission of Set i, the PRB indexes of the PRB pairs included in Set i, and the aggregation level configuration signalling of the base station with respect to the ePDCCH resource set; or X(i) is determined according to at least the value of the number N of the PRB pairs corresponding to Set i, the type (type L or type D) of ePDCCH transmission of Set i, the PRB indexes of the PRB pairs included in Set i, the ePDCCH transmission type of K ePDCCH resource sets and index i; or X(i) is determined according to at least the value of the number N of the PRB pairs corresponding to Set i, the type (type L or type D) of ePDCCH transmission of Set i, the PRB indexes of the PRB pairs included in Set i, K value and index i; or X(i) is determined according to at least the value of the number N of the PRB pairs corresponding to Set i, the type (type L or type D) of ePDCCH transmission of Set i, the PRB indexes of the PRB pairs included in Set i, the aggregation level configuration signalling of the base station with respect to the ePDCCH resource set, K value and index i; or X(i) is determined according to at least the value of the number N of the PRB pairs corresponding to Set i, the type (type L or type D) of ePDCCH transmission of Set i, the PRB indexes of the PRB pairs included in Set i, the ePDCCH transmission type of K ePDCCH resource sets, K value and index i; or X(i) is determined according to at least the value of the number N of the PRB pairs corresponding to Set i, the type (type L or type D) of ePDCCH transmission of Set i, the PRB indexes of the PRB pairs included in Set i, the aggregation level configuration signalling of the base station with respect to the ePDCCH resource set, the ePDCCH transmission type of K ePDCCH resource sets, K value and index i.

When X(i) is determined, the number of eREGs included in the eCCE may be taken into account; or when X(i) is determined, a DCI Format to be detected may be taken into account; or when X(i) is determined, the type of the subframe and/or one of the following three items may be taken into account to make a determination: a coding rate corresponding to the DCI Format to be detected transmitted in the subframe S, the number of Resource Elements (REs) available for transmitting the ePDCCH in the PRB pair in the subframe S, and the number of REs available for transmitting the ePDCCH in the eCCE in the subframe S.

The disclosure will be described in detail below through specific embodiments.

Embodiment 1

X(i) is determined according to (a) and (b);

in the subframe S, the base station configures K ePDCCH resource sets for the terminal, for example, the ePDCCH resource set includes Set1 and Set2 when K is 2; each Set includes N PRB pairs, wherein Set1 includes N1 PRB pairs, Set2 includes N2 PRB pairs, Set1 may be configured to be Localized type or Distributed type, Set2 may be configured to be Localized type or Distributed type.

Different subframes and different RE numbers of available ePDCCH transmission will cause the change of ePDCCH resource sets of Localized type and distributed type, but the ePDCCH resource sets of Localized type and distributed type are fixed for the same subframe, as shown in the following table:

TABLE 8

| Normal subframes and special subframes, configuration 3, 4, 8, with $n_{EPDCCH} < 104$ and using normal cyclic prefix | | All other cases | |
|---|---|---|---|
| Localized transmission | Distributed transmission | Localized transmission | Distributed transmission |
| 2 | 2 | 1 | 1 |
| 4 | 4 | 2 | 2 |
| 8 | 8 | 4 | 4 |
| 16 | 16 | 8 | 8 |
| — | 32 | — | 16 |

$N_{ECCE}$

Assume that the available aggregation level sets corresponding to Localized transmission and Distributed transmission is as shown in the following table:

TABLE 9

| Localized transmission | Distributed transmission |
|---|---|
| 1 | 1 |
| 2 | 2 |
| 4 | 4 |
| 8 | 8 |
| — | 16 |

The terminal determines the aggregation level to be detected according to the Localized/Distributed type configuration of the ePDCCH resource set and the number N of the PRBs in accordance with the rule as follows:

TABLE 10

| Type L, N = 2 | 1, 2 |
| Type L, N = 4 | 1, 2, 4 |
| Type L, N = 8 | 1, 2, 4, 8 |
| Type D, N = 2 | 1, 2, 4 |
| Type D, N = 4 | 2, 4, 8 |
| Type D, N = 8 | 4, 8, 16 |

Or, assume that due to the type of subframe and available RE, the ePDCCH resource set is as shown in the following table:

TABLE 11

| Localized transmission | Distributed transmission |
|---|---|
| 2 | 2 |
| 4 | 4 |
| 8 | 8 |
| 16 | 16 |
| — | 32 |

The terminal determines the aggregation level to be detected according to the Localized/Distributed type configuration of the ePDCCH resource set and the number N of the PRBs in accordance with the rule as follows:

TABLE 12

| Type L, N = 2 | 2, 4 |
| Type L, N = 4 | 2, 4, 8 |
| Type L, N = 8 | 2, 4, 8, 16 |
| Type D, N = 2 | 2, 4, 8 |
| Type D, N = 4 | 4, 8, 16 |
| Type D, N = 8 | 8, 16, 32 |

The terminal detects the aggregation level to be detected in the corresponding ePDCCH resource set after determining the aggregation level to be detected according to the number N of the PRBs and the ePDCCH resource set type.

The above methods may be equivalently described as: the base station performs joint encoding on the information of the number N of PRB pairs corresponding to Set i, the type of Set i (type L or type D), and the information of aggregation level that Set i requires to detect, and makes a notification.

Embodiment 2

X(i) is determined according to (a) and (b);

in the subframe S, the base station configures K ePDCCH resource sets for the terminal, for example, K is 2;

Set1 includes N1 PRB pairs, Set2 includes N2 PRB pairs, Set1 may be configured to be Localized type or Distributed type, Set2 may be configured to be Localized type or Distributed type.

Different subframes and different RE numbers of available ePDCCH transmission will cause the change of ePDCCH resource sets of Localized type and distributed type, but the ePDCCH resource sets of Localized type and distributed type are fixed for the same subframe, as shown in the following table:

TABLE 13

| $N_{ECCE}$ | | | |
|---|---|---|---|
| Normal subframes and special subframes, configuration 3, 4, 8, with $n_{EPDCCH} < 104$ and using normal cyclic prefix | | All other cases | |
| Localized transmission | Distributed transmission | Localized transmission | Distributed transmission |
| 2 | 2 | 1 | 1 |
| 4 | 4 | 2 | 2 |
| 8 | 8 | 4 | 4 |
|  | 16 |  | 8 |

Assume that the ePDCCH resource set is as shown in the following table:

TABLE 14

| Localized transmission | Distributed transmission |
|---|---|
| 1 | 1 |
| 2 | 2 |
| 4 | 4 |
|  | 8 |

The terminal determines the aggregation level to be detected according to the Localized/Distributed type configuration of the ePDCCH resource set and the number N of the PRBs in accordance with the rule as follows:

TABLE 15

| Type L, N = 2 | 1, 2 |
|---|---|
| Type L, N = 4 | 1, 2, 4 |
| Type L, N = 8 | 1, 2, 4 |
| Type D, N = 2 | 1, 2, 4 |
| Type D, N = 4 | 2, 4, 8 |
| Type D, N = 8 | 2, 4, 8 |

Or, assume that due to the type of subframe and available RE, the ePDCCH resource set is as shown in the following table:

TABLE 16

| Localized transmission | Distributed transmission |
|---|---|
| 2 | 2 |
| 4 | 4 |
| 8 | 8 |
|  | 16 |

The terminal determines the aggregation level to be detected according to the Localized/Distributed type configuration of the ePDCCH resource set and the number N of the PRBs in accordance with the rule as follows:

TABLE 17

| Type L, N = 2 | 2, 4 |
|---|---|
| Type L, N = 4 | 2, 4, 8 |
| Type L, N = 8 | 2, 4, 8 |
| Type D, N = 2 | 2, 4, 8 |
| Type D, N = 4 | 4, 8, 16 |
| Type D, N = 8 | 8, 16 |

The terminal detects the aggregation level to be detected in the corresponding ePDCCH resource set after determining the aggregation level to be detected according to the number N of the PRBs and the ePDCCH resource set type.

Embodiment 3

X(i) is determined according to (a) and (c);

in the subframe S, the base station configures K ePDCCH resource sets for the terminal, for example, K is 3;

Set1 includes N1 PRBs, Set2 includes N2 PRB pairs, Set3 includes N2 PRB pairs, Set1,2,3 may be respectively configured to be Localized type or Distributed type;

PRB Index in N PRBs may have some features, for example:

all the PRB Indexes in N PRBs are non-consecutive, as shown in FIG. 4;

or some PRB Indexes in N PRBs are consecutive, for example 2 PRB indexes are consecutive, as shown in FIG. 5;

It may be possible that more PRB Indexes (for example 4) are consecutive.

Different PRB indexes corresponding to the same N will have different detected aggregation levels, for example:

TABLE 18

| N = 4, non-consecutive PRB index | 1, 2, 4 |
|---|---|
| N = 4, 2 consecutive PRB indexes | 2, 4, 8 |
| N = 4, 4 consecutive PRB indexes | 4, 8 |
| N = 8, non-consecutive PRB index | 1, 2, 4 |
| N = 8, 2 consecutive PRB indexes | 2, 4, 8 |
| N = 8, 4 consecutive PRB indexes | 4, 8, 16 |

Or

TABLE 19

| N = 4, non-consecutive PRB index | 1, 2, 4 |
|---|---|
| N = 4, consecutive PRB index | 2, 4, 8 |
| N = 8, non-consecutive PRB index | 1, 2, 4 |
| N = 8, consecutive PRB index | 2, 4, 8, 16 |

Or

TABLE 20

| | |
|---|---|
| N = 4, non-consecutive PRB index | 2, 4 |
| N = 4, 2 consecutive PRB indexes | 4, 8 |
| N = 4, 4 consecutive PRB indexes | 8 |
| N = 8, non-consecutive PRB index | 2, 4 |
| N = 8, 2 consecutive PRB indexes | 4, 8 |
| N = 8, 4 consecutive PRB indexes | 8, 16 |

The terminal detects the aggregation level to be detected in the corresponding ePDCCH resource set after determining the aggregation level to be detected when the control signalling in Set I is detected according to the number N of PRBs and whether the PRB index has the consecutive PRB Index.

The above methods may be equivalently described as: the base station performs joint encoding on the information of the number N of PRB pairs corresponding to Set i, the PRB indexes of the PRB pairs included in Set i, and the information of aggregation level that Set i requires to detect, and makes a notification.

Embodiment 4

X(i) is determined according to (d);

in the subframe S, the base station configures K ePDCCH resource sets for the terminal, for example, K is 3;

Set1 includes N1 PRB pairs, Set2 includes N2 PRB pairs, Set3 includes N2 PRB pairs, Set1,2,3 may be respectively configured to be Localized type or Distributed type.

Different subframes and different RE numbers of available ePDCCH transmission will cause the change of ePDCCH resource sets of Localized type and distributed type, but the ePDCCH resource sets of Localized type and distributed type are fixed for the same subframe, as shown in the above embodiments.

The base station configures the AL of each aggregation level, such as K=2, and the base station transmits the signalling to configure the aggregation level of 2 ePDCCH resource sets as follows:

TABLE 21

| Set1 | Set2 |
|---|---|
| 1, 2 | 4, 8 |

Or

TABLE 22

| Set1 | Set2 |
|---|---|
| 1, 2 | 4, 8, 16 |

Or

TABLE 23

| Set1 | Set2 |
|---|---|
| 1, 2, 4 | 4, 8, 16 |

Or

TABLE 24

| Set1 | Set2 |
|---|---|
| 1, 2, 4 | 2, 4, 8 |

Or

TABLE 25

| Set1 | Set2 |
|---|---|
| 2, 4 | 4, 8, 16, 32 |

Such as K=2, the base station transmits the signalling to configure the aggregation level of 3 ePDCCH resource sets as follows:

TABLE 26

| Set 1 | Set 2 | Set 3 |
|---|---|---|
| 1, 2, | 4, 8 | 16 |

Or

TABLE 27

| Set 1 | Set 2 | Set 3 |
|---|---|---|
| 2, 4, | 8, 16 | 32 |

The terminal detects the aggregation level to be detected in the corresponding ePDCCH resource set after determining the aggregation level to be detected when the control signalling in Set i is detected according to the number K of ePDCCH resource sets and index i of each ePDCCH resource set.

It should be noted that the thought of X(i) is determined according to corresponding contents and some embodiments have been described in the above contents. When the detailed description involves a table, how to determine X(i) according to corresponding contents can be acquired from the corresponding relationships in the tables in conjunction with the thought and examples, so in the following embodiments, how to determine X(i) according to corresponding contents can be acquired from the corresponding relationships in the tables in conjunction with the thought and examples, and the tables are not described again.

Embodiment 5

X(i) is determined according to (a) and (d);

TABLE 28

| | Base station signalling bit indication 0 | Base station signalling bit indication 1 |
|---|---|---|
| N = 2 | 1, 2 | 1, 2, 4 |
| N = 4 | 1, 2, 4 | 1, 2, 4, 8 |
| N = 8 | 1, 2, 4 | 1, 2, 4, 8 |

Or

TABLE 29

|  | Base station signalling bit indication 0 | Base station signalling bit indication 1 |
| --- | --- | --- |
| N = 2 | 2, 4 | 2, 4 |
| N = 4 | 2, 4, 8 | 2, 4, 8, 16 |
| N = 8 | 2, 4, 8 | 2, 4, 8, 16 |

Or

TABLE 30

|  | Base station signalling bit indication 00 | Base station signalling bit indication 01 | Base station signalling bit indication 10 | Base station signalling bit indication 11 |
| --- | --- | --- | --- | --- |
| N = 2 | 2 | 4 | 2, 4 | Reserved |
| N = 4 | 2, 4 | 2, 4, 8 | 4, 8, 16 | 2, 4, 8, 16 |
| N = 8 | 2, 4, 8 | 4, 8, 16 | 8, 16 | 2, 4, 8, 16 |

The terminal detects the aggregation level to be detected in the corresponding ePDCCH resource set after determining the aggregation level to be detected when the control signalling in Set i is detected according to the number N of PRB and indication signalling of the aggregation level of the base station.

The above methods may be also equivalently described as: the base station performs joint encoding on the information of the number N of PRB pairs corresponding to Set i, and the information of aggregation level that Set i requires to detect, and makes a notification.

Embodiment 6

X(i) is determined according to (a) and (e);

TABLE 31

|  | K = 1, Distributed Set | 1D + 1L | 2L | 2d |
| --- | --- | --- | --- | --- |
| N = 2 | 1, 2, 4 | L detection 1, 2, 4<br>D detection 4, 8 | L1 detection 1, 2, 4<br>L2 detection 4, 8 | D1 detection 1, 2, 4<br>D2 detection 4, 8 |
| N = 4 | 1, 2, 4, 8 | L detection 1, 2, 4<br>D detection 8, 16 | L1 detection 1, 2, 4<br>L2 detection 8 | D1 detection 1, 2, 4<br>D2 detection 8, 16 |
| N = 8 | 1, 2, 4, 8, 16 | L detection 1, 2, 4<br>D detection 8, 16 | L1 detection 1, 2, 4<br>L2 detection 4, 8 | D1 detection 1, 2,<br>D2 detection 4, 8, 16 |

The terminal detects the aggregation level to be detected in the corresponding ePDCCH resource set after determining the aggregation level to be detected when the control signalling in Set i is detected according to the value of the number N of PRB pairs corresponding to Set i and the ePDCCH transmission type of K ePDCCH resource sets.

Embodiment 7

X(i) is determined according to (a) and (f);

TABLE 32

|  | Set 1 | Set 2 | Set 3 | Set 4 |
| --- | --- | --- | --- | --- |
| K = 1 | 1, 2, 4, 8 | — | — | — |
| K = 2 | 1, 2, | 4, 8 | — | — |
| K = 3 | 1, 2, | 4, 8 | 16 | — |
| K = 4 | 1, 2, | 2, 4 | 4, 8 | 8, 16 |

Or

TABLE 33

|  | Set 1 | Set 2 | Set 3 | Set 4 |
| --- | --- | --- | --- | --- |
| K = 1 | 2, 4, 8, 16 | — | — | — |
| K = 2 | 2, 4, | 8, 16 | — | — |
| K = 3 | 2, 4, | 8, 16 | 32 | — |
| K = 4 | 2, 4, | 4, 8 | 8, 16 | 16, 32 |

The terminal detects the aggregation level to be detected in the corresponding ePDCCH resource set after determining the aggregation level to be detected when the control signalling in Set i is detected according to the K value and number i of Set i.

Embodiment 8

X(i) is determined according to (a) and (g);

TABLE 34

| N = 4, eCCE includes 8 eREGs | 1, 2, 4 |
| --- | --- |
| N = 4, eCCE includes 4 eREGs | 2, 4, 8 |
| N = 8, eCCE includes 8 eREGs | 2, 4, 8 |
| N = 8, eCCE includes 4 eREGs | 4, 8, 16 |

The terminal detects the aggregation level to be detected in the corresponding ePDCCH resource set after determining the aggregation level to be detected when the control signalling in Set i is detected according to the N value and the number of eREGs included in the eCCE.

Embodiment 9

X(i) is determined according to (a) and (h);

TABLE 35

| N = 4, DCI Format 1A | 1, 2, 4 |
| --- | --- |
| N = 4, DCI Format 2C | 2, 4, 8 |
| N = 8, DCI Format 1A | 2, 4, 8 |
| N = 8, DCI Format 2C | 4, 8, 16 |

TABLE 36

| N = 4, DCI Format 0 | 1, 2, 4 |
| --- | --- |
| N = 4, DCI Format 4 | 2, 4, 8 |
| N = 8, DCI Format 0 | 2, 4, 8 |
| N = 8, DCI Format 4 | 4, 8, 16 |

Embodiment 10

X(i) is determined according to (b) and (c);

TABLE 37

| | |
|---|---|
| The type of Set i is L, non-consecutive PRB pair Index | 1, 2, 4 |
| The type of Set i is L, consecutive PRB pair Index | 2, 4, 8 |
| The type of Set i is D, non-consecutive PRB pair Index | 1, 2, 4, 8 |
| The type of Set i is D, consecutive PRB pair Index | 2, 4, 8, 16 |

TABLE 38

| | |
|---|---|
| The type of Set i is L, non-consecutive PRB pair Index | 1, 2, 4 |
| The type of Set i is L, consecutive PRB pair Index | 2, 4, 8, 16 |
| The type of Set i is D, non-consecutive PRB pair Index | 1, 2, 4, 8 |
| The type of Set i is D, consecutive PRB pair Index | 2, 4, 8, 16, 32 |

TABLE 39

| | |
|---|---|
| The type of Set i is L, non-consecutive PRB pair Index | 1, 2, 4 |
| The type of Set i is L, 2 consecutive PRB pair Indexes | 2, 4, 8 |
| The type of Set i is L, 4 consecutive PRB pair Indexes | 4, 8 |
| The type of Set i is D, non-consecutive PRB pair Index | 1, 2, 4, 8 |
| The type of Set i is D, 2 consecutive PRB pair Indexes | 2, 4, 8, 16 |
| The type of Set i is D, 4 consecutive PRB pair Indexes | 8, 16 |

Embodiment 11

X(i) is determined according to (b) and (d);

TABLE 40

| | |
|---|---|
| The type of Set i is L, the bit of the configuration signalling of the base station is 00 | 1, 2, 4 |
| The type of Set i is L, the bit of the configuration signalling of the base station is 01 | 2, 4, 8 |
| The type of Set i is L, the bit of the configuration signalling of the base station is 10 | 4, 8 |
| The type of Set i is L, the bit of the configuration signalling of the base station is 11 | 1, 2, 4, 8 |
| The type of Set i is D, the bit of the configuration signalling of the base station is 00 | 1, 2, 4, 8 |
| The type of Set i is D, the bit of the configuration signalling of the base station is 01 | 2, 4, 8, 16 |
| The type of Set i is D, the bit of the configuration signalling of the base station is 10 | 8, 16 |
| The type of Set i is D, the bit of the configuration signalling of the base station is 11 | 1, 2, 4, 8, 16 |

TABLE 41

| | |
|---|---|
| The type of Set i is L, the bit of the configuration signalling of the base station is 0 | 1, 2, 4 |
| The type of Set i is L, the bit of the configuration signalling of the base station is 1 | 1, 2, 4, 8 |
| The type of Set i is D, the bit of the configuration signalling of the base station is 00 | 1, 2, 4, 8 |
| The type of Set i is D, the bit of the configuration signalling of the base station is 01 | 1, 2, 4, 8, 16 |

Embodiment 12

X(i) is determined according to (b) and (e);

TABLE 42

| | The type of ePDCCH resource set is L | The type of ePDCCH resource set is D |
|---|---|---|
| 1 ePDCCH resource set, the type is 1D | — | 1, 2, 4, 8, 16 |
| 2 ePDCCH resource sets, the type is 1L 1D | 1, 2, 4, 8 | 8, 16 |

Embodiment 13

X(i) is determined according to (b) and (g);

TABLE 43

| | The type of ePDCCH resource set is L | The type of ePDCCH resource set is D |
|---|---|---|
| eREG includes 4 eREGs | 1, 2, 4 | 4, 8 |
| eREG includes 8 eREGs | 1, 2, 4, 8 | 8, 16 |

TABLE 44

| | The type of ePDCCH resource set is L | The type of ePDCCH resource set is D |
|---|---|---|
| eREG includes 4 eREGs | 2, 4 | 8, 16 |
| eREG includes 8 eREGs | 2, 4, 8 | 8, 16, 32 |

Embodiment 14

X(i) is determined according to (b) and (h);

TABLE 45

| | The type of ePDCCH resource set is L | The type of ePDCCH resource set is D |
|---|---|---|
| DCI Format 1A | 1, 2, 4 | 4, 8 |
| DCI Format 2C | 2, 4, 8 | 8, 16 |

TABLE 46

|  | The type of ePDCCH resource set is L | The type of ePDCCH resource set is D |
| --- | --- | --- |
| DCI Format 1A | 2, 4 | 8, 16 |
| DCI Format 2C | 2, 4, 8 | 8, 16, 32 |

Embodiment 15

X(i) is determined according to (c) and (d);

TABLE 47

| | |
| --- | --- |
| The signalling bit is 00, non-consecutive PRB pair Index | 1, 2, 4 |
| The signalling bit is 01, non-consecutive PRB pair Index | 1, 2, 4, 8 |
| The signalling bit is 10, non-consecutive PRB pair Index | 1, 2 |
| The signalling bit is 11, non-consecutive PRB pair Index | 4, 8 |
| The signalling bit is 00, consecutive PRB pair Index | 1, 2, 4, 8 |
| The signalling bit is 01, consecutive PRB pair Index | 4, 8 |
| The signalling bit is 10, consecutive PRB pair Index | 2, 4, 8 |
| The signalling bit is 11, consecutive PRB pair Index | resvered |

Embodiment 16

X(i) is determined according to (c) and (f);

TABLE 48

| | Set 1 | | Set 2 | | Set 3 | | Set 4 | |
| --- | --- | --- | --- | --- | --- | --- | --- | --- |
| | Non-consecutive PRB index | Consecutive PRB index | Non-consecutive PRB index | Consecutive PRB index | Non-consecutive PRB index | Consecutive PRB index | Non-consecutive PRB index | Consecutive PRB index |
| K = 1 | 1, 2, 4, 8 | 2, 4, 8 | — | — | — | — | — | — |
| K = 2 | 1, 2, 4 | 4, 8 | 2, 4 | 8 | — | — | — | — |
| K = 3 | 1, 2 | 4, 8 | 2, 4 | 8 | — | 16 | — | — |
| K = 4 | 1, 2, 4 | 2, 4, 8 | 2, 4 | 4, 8 | 4 | 8 | 8 | 16 |

Or

TABLE 49

| | Set 1 | | Set 2 | | Set 3 | | Set 4 | |
| --- | --- | --- | --- | --- | --- | --- | --- | --- |
| | Non-consecutive PRB index | Consecutive PRB index | Non-consecutive PRB index | Consecutive PRB index | Non-consecutive PRB index | Consecutive PRB index | Non-consecutive PRB index | Consecutive PRB index |
| K = 1 | 2, 4, 8, 16 | 4, 8, 16 | — | — | — | — | — | — |
| K = 2 | 2, 4, 8 | 8, 16 | 4, 8 | 16 | — | — | — | — |
| K = 3 | 2, 4 | 8, 16 | 4, 8 | 16 | — | 32 | — | — |
| K = 4 | 2, 4, 8 | 4, 8, 16 | 4, 8 | 8, 16 | 8 | 16 | 16 | 32 |

Embodiment 17

X(i) is determined according to (c) and (f);

TABLE 50

| | |
| --- | --- |
| The number of eREGs included in eCCE is 8, non-consecutive PRB pair Index | 1, 2, 4 |
| The number of eREGs included in eCCE is 8, 2 consecutive PRB pair Indexes | 2, 4, 8 |
| The number of eREGs included in eCCE is 8, 4 consecutive PRB pair Indexes | 4, 8, 16 |
| The number of eREGs included in eCCE is 4, non-consecutive PRB pair Index | 2, 4 |
| The number of eREGs included in eCCE is 4, 2 consecutive PRB pair Indexes | 4, 8 |
| The number of eREGs included in eCCE is 4, 4 consecutive PRB pair Indexes | 8, 16 |

Embodiment 18

X(i) is determined according to (c) and (h);

TABLE 51

| | |
| --- | --- |
| DCI format 1A, non-consecutive PRB pair Index | 1, 2, 4 |
| DCI format 1A, 2 consecutive PRB pair Indexes | 2, 4, 8 |
| DCI format 2c, non-consecutive PRB pair Index | 2, 4 |
| DCI format 2c, 2 consecutive PRB pair Indexes | 4, 8 |

Embodiment 19

X(i) is determined according to (d) and (e);

TABLE 52

| | |
|---|---|
| The signalling bit is 00, 1D + 1L | L: 1, 2, 4 D 8, 16 |
| The signalling bit is 01, 1D + 1L | L: 1, 2, D 4, 8, 16 |
| The signalling bit is 00, 2L | L1: 1, 2, 4 L2: 8 |
| The signalling bit is 00, 2L | L1: 1, 2, 4 L2: 8 |

Embodiment 20

X(i) is determined according to (d) and (g);

TABLE 53

| | |
|---|---|
| The number of eREGs included in eCCE is 8, signalling bit 00 | 1, 2, 4 |
| The number of eREGs included in eCCE is 8, signalling bit 01 | 2, 4, 8 |
| The number of eREGs included in eCCE is 8, signalling bit 10 | 4, 8, 16 |
| The number of eREGs included in eCCE is 8, signalling bit 11 | Reserved |
| The number of eREGs included in eCCE is 4, signalling bit 00 | 2, 4 |

TABLE 53-continued

| | |
|---|---|
| The number of eREGs included in eCCE is 4, signalling bit 01 | 4, 8 |
| The number of eREGs included in eCCE is 4, signalling bit 10 | 8, 16 |
| The number of eREGs included in eCCE is 4, signalling bit 11 | Reserved |

Embodiment 21

X(i) is determined according to (d) and (h);

TABLE 54

| | |
|---|---|
| DCI Format 1A, signalling bit 00 | 1, 2, 4 |
| DCI Format 1A, signalling bit 01 | 2, 4, 8 |
| DCI Format 1A, signalling bit 10 | 4, 8, 16 |
| DCI Format 1A, signalling bit 11 | Reserved |
| DCI Format 2C, signalling bit 00 | 2, 4 |
| DCI Format 2C, signalling bit 01 | 4, 8 |
| DCI Format 2C, signalling bit 10 | 8, 16 |
| DCI Format 2C, signalling bit 11 | Reserved |

Embodiment 22

X(i) is determined according to (e) and (f);

TABLE 55

| K = 1 | Configure 1: 1D | Configure 2: 1L |
|---|---|---|
| | 1, 2, 4, 8, 16 | 1, 2, 4, 8 |
| K = 2 | Configure 1: 1D + 1L | Configure 2: 2D |
| | L: 1, 2, 4   D: 2, 4, 8, 16 | D1: 1, 2, 4   D2: 8, 16 |
| K = 3 | Configure 1: 2D + 1L | 2L + 1D |
| | L: 1, 2, 4   D1: 4, 8   D2: 16 | L1: 1, 2   L2: 4, 8   D1: 4, 8, 16 |
| K = 4 | Configure 1: 2D + 2L | Configure 2: 3D + 1L |
| | L1: 1, 2, 4   L2: 8   D1: 4, 8   D2: 16 | L1: 1, 2, 4   D1: 1, 2, 4   D2: 8   D3: 16 |

Or

TABLE 56

| K = 1 | Configure 1: 1D | Configure 2: 1L |
|---|---|---|
| | 2, 4, 8, 16, 32 | 2, 4, 8, 16 |
| K = 2 | Configure 1: 1D + 1L | Configure 2: 2D |
| | L: 2, 4, 8   D: 4, 8, 16, 32 | D1: 2, 4, 8   D2: 16, 32 |
| K = 3 | Configure 1:2D + 1L | 2L + 1D |
| | L: 2, 4, 8   D1: 8, 16   D2: 32 | L1: 2, 4   L2: 8, 16   D1: 8, 16, 32 |
| K = 4 | Configure 1: 2D + 2L | Configure 2: 3D + 1L |
| | L1: 4, 8, 16   L2: 16   D1: 8, 16   D2: 32 | L1: 2, 4, 8   D1: 2, 4, 8   D2: 16   D3: 32 |

Embodiment 23

X(i) is determined according to (e), (f) and (g);

TABLE 57

| K = 1, eCCE includes 8 eREGs | Configure 1: 1D | Configure 2: 1L |
|---|---|---|
| | 1, 2, 4, 8, 16 | 1, 2, 4, 8 |
| K = 2, eCCE includes 8 eREGs | Configure 1: 1D + 1L | Configure 2: 2D |
| | L: 1, 2, 4   D: 2, 4, 8, 16 | D1: 1, 2, 4   D2: 8, 16 |
| K = 3, eCCE includes 8 eREGs | Configure 1: 2D + 1L | 2L + 1D |
| | L: 1, 2, 4   D1: 4, 8   D2: 16 | L1: 1, 2   L2: 4, 8   D1: 4, 8, 16 |

TABLE 57-continued

| | Configure 1: 2D + 2L | | | | Configure 2: 3D + 1L | | | |
|---|---|---|---|---|---|---|---|---|
| K = 4, eCCE includes 8 eREGs | L1: 1, 2, 4 | L2: 8 | D1: 4, 8 | D2: 16 | L1: 1, 2, 4 | D1: 1, 2, 4 | D2: 8 | D3: 16 |
| | Configure 1: 1D | | | | Configure 2: 1L | | | |
| K = 1, eCCE includes 4 eREGs | 2, 4, 8, 16, 32 | | | | 2, 4, 8, 16 | | | |
| | Configure 1: 1D + 1L | | | | Configure 2: 2D | | | |
| K = 2, eCCE includes 4 eREGs | L: 2, 4, 8 | D: 4, 8, 16, 32 | | | D1: 2, 4, 8 | D2: 16, 32 | | |
| | Configure 1: 2D + 1L | | | | 2L + 1D | | | |
| K = 3, eCCE includes 4 eREGs | L: 2, 4, 8 | D1: 8, 16 | D2: 32 | | L1: 2, 4 | L2: 8, 16 | D1: 8, 16, 32 | |
| | Configure 1: 2D + 2L | | | | Configure 2: 3D + 1L | | | |
| K = 4, eCCE includes 4 eREGs | L1: 4, 8, 16 | L2: 16 | D1: 8, 16 | D2: 32 | L1: 2, 4, 8 | D1: 2, 4, 8 | D2: 16 | D3: 32 |

Embodiment 24

X(i) is determined according to (e), (f) and (g) and thresholds;

TABLE 58

| | Configure 1: 1D | | Configure 2: 1L | |
|---|---|---|---|---|
| K = 1, eCCE includes 8 eREGs, or eCCE includes 4 eREGs, the RE number of available transmission ePDCCH of PRB pair is more than a predetermined threshold | 1, 2, 4, 8, 16 | | 1, 2, 4, 8 | |
| | Configure 1: 1D + 1L | | Configure 2: 2D | |
| K = 2, eCCE includes 8 eREGs, or eCCE includes 4 eREGs, the RE number of available transmission ePDCCH of PRB pair is more than a predetermined threshold | L: 1, 2, 4 | D: 2, 4, 8, 16 | D1: 1, 2, 4 | D2: 8, 16 |
| | Configure 1: 2D + 1L | | 2L + 1D | | |
| K = 3, eCCE includes 8 eREGs, or eCCE includes 4 eREGs, the RE number of available transmission ePDCCH of PRB pair is more than a predetermined threshold | L: 1, 2, 4 | D1: 4, 8 | D2: 16 | L1: 1, 2 | L2: 4, 8 | D1: 4, 8, 16 |

TABLE 58-continued

| Condition | Configure 1 | Configure 2 |
|---|---|---|
| K = 4, eCCE includes 8 eREGs, or eCCE includes 4 eREGs, the RE number of available transmission ePDCCH of PRB pair is more than a predetermined threshold | Configure 1: 2D + 2L   L1: 1, 2, 4   L2: 8   D1: 4, 8   D2: 16 | Configure 2: 3D + 1L   L1: 1, 2, 4   D1: 1, 2, 4   D2: 8   D3: 16 |
| K = 1, eCCE includes 4 eREGs, the RE number of available transmission ePDCCH of PRB pair is less than a predetermined threshold | Configure 1: 1 D   2, 4, 8, 16, 32 | Configure 2: 1L   2, 4, 8, 16 |
| K = 2, eCCE includes 4 eREGs, the RE number of available transmission ePDCCH of PRB pair is less than a predetermined threshold | Configure 1: 1D + 1L   L: 2, 4, 8   D: 4, 8, 16, 32 | Configure 2: 2D   D1: 2, 4, 8   D2: 16, 32 |
| K = 3, eCCE includes 4 eREGs, the RE number of available transmission ePDCCH of PRB pair is less than a predetermined threshold | Configure 1: 2D + 1L   L: 2, 4, 8   D1: 8, 16   D2: 32 | 2L + 1D   L1: 2, 4   L2: 8, 16   D1: 8, 16, 32 |
| K = 4, eCCE includes 4 eREGs, the RE number of available transmission ePDCCH of PRB pair is less than a predetermined threshold | Configure 1: 2D + 2L   L1: 4, 8, 16   L2: 16   D1: 8, 16   D2: 32 | Configure 2: 3D + 1L   L1: 2, 4, 8   D1: 2, 4, 8   D2: 16   D3: 32 |

Embodiment 25

X(i) is determined according to (a), (b) and (c);

TABLE 59

|  | Non-consecutive PRB index | Consecutive PRB index |
|---|---|---|
| Type L, N = 2 | 1, 2 | 4 |
| Type L, N = 4 | 1, 2, 4 | 8 |
| Type L, N = 8 | 1, 2, 4, 8 | 8 |
| Type D, N = 2 | 1, 2, 4 | 1, 2, 4 |
| Type D, N = 4 | 2, 4, 8 | 2, 4, 8 |
| Type D, N = 8 | 4, 8, 16 | 4, 8, 16 |

Embodiment 26

X(i) is determined according to (a), (b) and (d);

TABLE 60

|  | Configuration signalling 00 | Configuration signalling 01 |
|---|---|---|
| Type L, N = 2 | 1, 2, 4 | 2, 4 |
| Type L, N = 4 | 1, 2, 4 | 2, 4 |
| Type L, N = 8 | 1, 2, 4, 8 | 2, 4, 8 |
| Type D, N = 2 | 1, 2, 4 | 2, 4 |
| Type D, N = 4 | 1, 2, 4, 8 | 4, 8, 16 |
| Type D, N = 8 | 1, 2, 4, 8, 16 | 2, 4, 8, 16 |

Embodiment 27

X(i) is determined according to (a), (b), (e), (f) and (g)

TABLE 61

|  | K = 1, Distributed Set | 1D + 1L | 2L | 2d |
|---|---|---|---|---|
| N = 2, eCCE includes 8 eREGs, or eCCE includes 4 eREGs, the RE number of available transmission ePDCCH of PRB pair is more than a predetermined threshold | 1, 2, 4 | L detection 1, 2, 4 D detection 4, 8 | L1 detection 1, 2, 4 L2 detection 4, 8 | D1 detection 1, 2, 4 D2 detection 4, 8 |
| N = 4, eCCE includes 8 eREGs, or eCCE includes 4 eREGs, the RE number of available transmission ePDCCH of PRB pair is more than a predetermined threshold | 1, 2, 4, 8 | L detection 1, 2, 4, D detection 8, 16 | L1 detection 1, 2, 4 L2 detection 8 | D1 detection 1, 2, 4 D2 detection 8, 16 |
| N = 8, eCCE includes 8 eREGs, or eCCE includes 4 eREGs, the RE number of available transmission ePDCCH of PRB pair is more than a predetermined threshold | 1, 2, 4, 8, 16 | L detection 1, 2, 4, D detection 8, 16 | L1 detection 1, 2, L2 detection 4, 8 | D1 detection 1, 2, D2 detection 4, 8, 16 |
| N = 2, eCCE includes 4 eREGs, the RE number of available transmission ePDCCH of PRB pair is less than a predetermined threshold | 2, 4, 8 | L detection 2, 4, 8 D detection 8, 16 | L1 detection 2, 4, 8, L2 detection 8, 16 | D1 detection 2, 4, 8 D2 detection 8, 16 |
| N = 4, eCCE includes 4 eREGs, the RE number of available transmission ePDCCH of PRB pair is less than a predetermined threshold | 2, 4, 8, 16 | L detection 2, 4, 8, D detection 16, 32 | L1 detection 2, 4, 8, L2 detection 16 | D1 detection 2, 4, 8 D2 detection 16, 32 |
| N = 8, eCCE includes 4 eREGs, the RE number of available transmission ePDCCH of PRB pair is less than a predetermined threshold | 2, 4, 8, 16, 32 | L detection 2, 4, 8, D detection 16, 32 | L1 detection 2, 4, L2 detection 8, 16 | D1 detection 2, 4, D2 detection 8, 16, 32 |

Embodiment 28

X(i) is determined according to (b), (e), (f) and (g);

TABLE 62

| K = 1, Distributed ePDCCH resource set | 1D + 1L | 2L | 2d |
|---|---|---|---|
| eCCE includes 4 eREGs, and the RE number of available transmission ePDCCH of PRB pair is more than a predetermined threshold | 1, 2, 4, 8 | L detection 1, 2, 4, D detection 8, 16 | L1 detection 1, 2, 4 L2 detection 8 | D1 detection 1, 2, 4 D2 detection 8, 16 |
| eCCE includes 8 eREGs | 2, 4, 8, 16 | L detection 2, 4, 8, D detection 16, 32 | L1 detection 2, 4, 8, L2 detection 16 | D1 detection 2, 4, 8 D2 detection 16, 32 |

Embodiment 29

X(i) is determined according to (e), (f) and (g);

TABLE 63

| | K = 1 | K = 2 |
|---|---|---|
| eCCE includes 4 eREGs, and the RE number of available transmission ePDCCH of PRB pair is more than a predetermined threshold | Set1 detection 1, 2, 4, 8 | Set1 detection 1, 2, 4, Set2 detection 8, 16 |
| eCCE includes 8 eREGs | Set1 detection 2, 4, 8, 16 | Set1 detection 2, 4, 8, Set2 detection 16, 32 |

Embodiment 30

X(i) is determined according to (e), (f), (g) and (h);

TABLE 64

| | | K = 1 | K = 2 |
|---|---|---|---|
| DCI Format 1A | eCCE includes 8 eREGs, eCCE includes 4 eREGs, and the RE number of available transmission ePDCCH of PRB pair is more than a predetermined threshold | Set1 detection 1, 2, 4, 8 | Set1 detection 1, 2, 4, Set2 detection 8, 16 |
| | eCCE includes 4 eREGs, and the RE number of available transmission ePDCCH of PRB pair is less than a predetermined threshold | Set1 detection 2, 4, 8, 16 | Set1 detection 2, 4, 8, Set2 detection 16, 32 |
| DCI Format 2C | eCCE includes 8 eREGs, eCCE includes 4 eREGs, and the RE number of available transmission ePDCCH of PRB pair is more than a predetermined threshold | Set1 detection 1, 2, 4, 8 | Set1 detection 1, 2, 4, Set2 detection 8, 16 |
| | eCCE includes 4 eREGs, and the RE number of available transmission | Set1 detection 2, 4, 8, 16 | Set1 detection 2, 4, 8, Set2 detection |

TABLE 64-continued

| | K = 1 | K = 2 |
|---|---|---|
| ePDCCH of PRB pair is less than a predetermined threshold | | 16, 32 |

Embodiment 31

The available AL set corresponding to the ePDCCH resource set of the Localized type is {1, 2, 4, 8}, and the available AL set corresponding to the ePDCCH resource set of the Distributed type is {1, 2, 4, 8, 16}.

For example, there are 2 Localized sets and 1 distributed set:

TABLE 65

| AL set corresponding to one Localized ePDCCH resource set | AL set corresponding to another Localized ePDCCH resource set | AL set corresponding to Distributed ePDCCH resource set |
|---|---|---|
| 1, 2, 4 | 8 | 16 |
| 1, 2 | 4, 8 | 16 |
| 1, 2, 4 | 4, 8 | 16 |
| 1 | 2, 4, 8 | 16 |
| 1, 2, 4 | 2, 4, 8 | 16 |

Embodiment 32

There are 3 ePDCCH resource sets, one type D and two type L. The available AL set corresponding to the ePDCCH resource set of the Localized type is {2, 4, 8, 16}, and the available AL set corresponding to the ePDCCH resource set of the Distributed type is {2, 4, 8, 16, 32}.

TABLE 66

| AL set corresponding to one Localized ePDCCH resource set | AL set corresponding to another Localized ePDCCH resource set | AL set corresponding to Distributed ePDCCH resource set |
|---|---|---|
| 2, 4, 8 | 16 | 8, 16, 32 |
| 2, 4 | 8, 16 | 8, 16, 32 |
| 2, 4, 8 | 8, 16 | 8, 16, 32 |
| 2 | 4, 8, 16 | 8, 16, 32 |
| 2, 4, 8 | 4, 8, 16 | 8, 16, 32 |

Embodiment 33

There are 3 ePDCCH resource sets, one type D and two type L. The available AL set corresponding to the ePDCCH resource set of the Localized type is {2, 4, 8}, and the available AL set corresponding to the ePDCCH resource set of the Distributed type is {2, 4, 8, 16}.

TABLE 67

| AL set corresponding to one Localized ePDCCH resource set | AL set corresponding to another Localized ePDCCH resource set | AL set corresponding to Distributed ePDCCH resource set |
|---|---|---|
| 2, 4 | 8 | 8, 16 |
| 2 | 4, 8 | 8, 16 |
| 2 | 4, 8 | 4, 8, 16 |

Embodiment 34

There are 2 ePDCCH resource sets of Localized type and 2 ePDCCH resource sets of distributed type, having the following configurations:

TABLE 68

| AL set corresponding to one Localized ePDCCH resource set | AL set corresponding to another Localized ePDCCH resource set | AL set corresponding to one Distributed ePDCCH resource set | AL set corresponding to another Distributed ePDCCH resource set |
|---|---|---|---|
| 1, 2, 4 | 8 | 4, 8 | 16 |
| 1, 2 | 4, 8 | 4, 8 | 16 |
| 1, 2, 4 | 4, 8 | 4, 8 | 16 |
| 1 | 2, 4, 8 | 4, 8 | 16 |
| 1, 2, 4 | 2, 4, 8 | 8 | 16 |
| 2, 4, 8 | 16 | 8, 16 | 32 |
| 2, 4 | 8, 16 | 8, 16 | 32 |
| 2, 4, 8 | 8, 16 | 8, 16 | 32 |
| 2 | 4, 8, 16 | 8, 16 | 32 |
| 2, 4, 8 | 4, 8, 16 | 8, 16 | 32 |

Embodiment 35

There are 1 ePDCCH resource set of Localized type and 1 ePDCCH resource set of distributed type, having the following configurations:

TABLE 69

| AL set corresponding to all the Localized ePDCCH resource sets | AL set corresponding to all the Distributed |
|---|---|
| 1, 2, 4 | 8 |
| 1, 2, | 4, 8 |
| 2, 4 | 8, 16 |
| 2, 4, 8 | 16 |
| 1, 2, 4 | 8, 16 |
| 1, 2, | 4, 8, 16 |
| 2, 4, 8 | 16, 32 |
| 2, 4, | 8, 16, 32 |
| 1, 2, 4 | 4, 8 |
| 1, 2, 4 | 2, 4, 8 |
| 1, 2, | 2, 4, 8 |
| 2, 4 | 4, 8, 16 |
| 2, 4, 8 | 8, 16 |
| 2, 4, 8 | 4, 8, 16 |
| 1, 2, 4 | 8, 16 |
| 1, 2, | 4, 8, 16 |
| 1, 2, 4 | 4, 8, 16 |
| 2, 4, 8 | 16, 32 |
| 2, 4, 8 | 8, 16, 32 |
| 2, 4, | 8, 16, 32 |

TABLE 69-continued

| AL set corresponding to all the Localized ePDCCH resource sets | AL set corresponding to all the Distributed |
|---|---|
| 2, 4, 8, 16 | 32 |
| 2, 4, 8, 16 | 16, 32 |
| 2, 4, 8, 16 | 8, 16, 32 |

Embodiment 36

There are 2 ePDCCH resource sets, both of which belongs to type D:

TABLE 70

| AL set corresponding to one Distributed ePDCCH resource set | AL set corresponding to another Distributed ePDCCH resource set |
|---|---|
| 1, 2, 4, 8 | 16 |
| 1, 2, 4 | 8, 16 |
| 1, 2 | 4, 8, 16 |
| 1 | 2, 4, 8, 16 |
| 1, 2, 4 | 4, 8, 16 |
| 1, 2, 4, 8 | 8, 16 |
| 1, 2, 4, 8 | 4, 8, 16 |
| 1, 2, 4, 8 | 2, 4, 8, 16 |
| 2, 4, 8, 16 | 32 |
| 2, 4, 8 | 16, 32 |
| 2, 4 | 8, 16, 32 |
| 2 | 4, 8, 16, 32 |
| 2, 4, 8 | 8, 16, 32 |
| 2, 4, 8, 16 | 16, 32 |
| 2, 4, 8, 16 | 8, 16, 32 |
| 2, 4, 8, 16 | 4, 8, 16, 32 |

Figure 6:
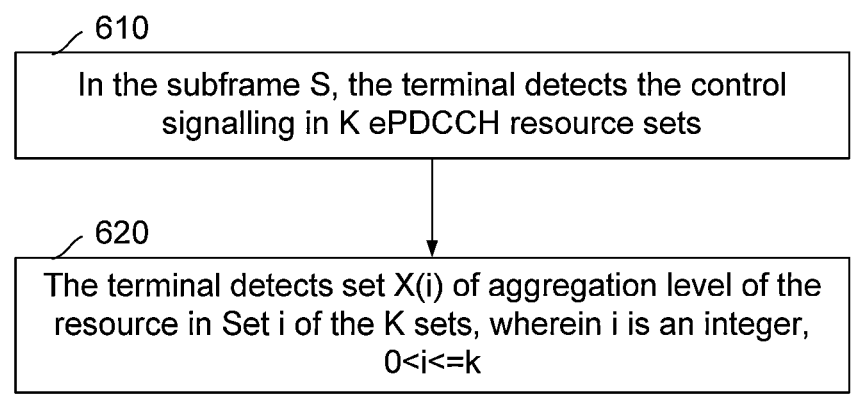
FIG. 6 is a flowchart of detecting control signalling according to an embodiment of the disclosure.

It can be seen from the above description that the embodiments of detecting the control signalling of the disclosure may represent the flow as shown in FIG. 6. The flow includes the following steps:

Step 610: in the subframe S, the terminal detects the control signalling in K ePDCCH resource sets;

Step 620: the terminal detects set X(i) of aggregation level of the resource in Set i of the K sets, wherein i is an integer, $0<i<=k$.

To sum up, whether the method or the device, by adopting the technologies for detecting the control signalling and implementing control signalling detection according to the embodiments of the disclosure, detection of each ePDCCH resource set is more targeted so that detection of unreasonable aggregation level is avoided and the detection efficiency is enhanced.

The above are only the preferred embodiments of the disclosure, and not intended to limit the scope of protection of the disclosure.

What is claimed is:

1. A method for detecting control signaling, comprising:
   receiving, by a terminal, a subframe (S) from a base station;
   in the subframe (S), detecting, by the terminal, the control signaling in K enhanced Physical Downlink Control Channel (ePDCCH) resource sets, wherein K is an integer greater than or equal to 1;

detecting, by the terminal, a resource aggregation level (AL) set X(i) in Set i of the K ePDCCH resource sets, wherein i is an integer, 0<i<=K, wherein X(i) is determined according to at least one of the following:

(a) number N of Physical Resource Block (PRB) pairs corresponding to Set i;
(b) type of Set i;
(c) PRB indexes of the PRB pairs included in Set i;
(d) the aggregation level configuration signaling of the base station with respect to the ePDCCH resource sets;
(e) ePDCCH transmission types of the ePDCCH resource sets;
(f) K value and index i of the ePDCCH resource sets; and
(g) number of enhanced Resource Element Groups (eREGs) included in an enhanced Control Channel Element (eCCE).

2. The method according to claim 1, wherein:

when K is an integer of more than 1, in the subframe (S), X(i) is consecutive partial or full ALs in all available AL sets corresponding to a type of Set i, and at least one X(i) is the consecutive partial ALs in all of available AL sets;

in the subframe (S), the available AL set corresponding to the ePDCCH resource set of a Localized type is {1, 2, 4}, and the available AL set corresponding to the ePDCCH resource set of a Distributed type is {1, 2, 4, 8};

or, in the subframe (S), the available AL set corresponding to the ePDCCH resource set of the Localized type is {1, 2, 4, 8}, and the available AL set corresponding to the ePDCCH resource set of the Distributed type is {1, 2, 4, 8, 16};

or, in the subframe (S), the available AL set corresponding to the ePDCCH resource set of the Localized type is {2, 4, 8}, and the available AL set corresponding to the ePDCCH resource set of the Distributed type is {2, 4, 8, 16};

or, in the subframe (S), the available AL set corresponding to the ePDCCH resource set of the Localized type is {2, 4, 8, 16}, and the available AL set corresponding to the ePDCCH resource set of the Distributed type is {2, 4, 8, 16, 32};

the aggregation level sets to be detected corresponding to multiple Sets have no intersections or have intersections including one AL or intersections including 2 ALs;

the AL set corresponding to Set is as shown in the following table:

| AL sets corresponding to all Localized transmissions | AL sets corresponding to all Distributed transmissions |
|---|---|
| 1, 2, 4 | 8 |
| 1, 2, | 4, 8 |
| 2, 4 | 8, 16 |
| 2, 4, 8 | 16 |
| 1, 2, 4 | 8, 16 |
| 1, 2, | 4, 8, 16 |
| 2, 4, 8 | 16, 32 |
| 2, 4, | 8, 16, 32 |
| 1, 2, 4 | 4, 8 |
| 1, 2, 4 | 2, 4, 8 |
| 1, 2, | 2, 4, 8 |
| 2, 4 | 4, 8, 16 |
| 2, 4, 8 | 8, 16 |
| 2, 4, 8 | 4, 8, 16 |
| 1, 2, 4 | 8, 16 |
| 1, 2, | 4, 8, 16 |
| 1, 2, 4 | 4, 8, 16 |
| 2, 4, 8 | 16, 32 |
| 2, 4, 8 | 8, 16, 32 |
| 2, 4, | 8, 16, 32 |
| 2, 4, 8, 16 | 32 |
| 2, 4, 8, 16 | 16, 32 |
| 2, 4, 8, 16 | 8, 16, 32. |

3. The method according to claim 1, wherein:

when K is an integer of more than 1, and ePDCCH resource sets of a same type exist, the aggregation levels to be detected corresponding to multiple ePDCCH resource sets of the ePDCCH transmission type in the same ePDCCH resource set are different; and the aggregation levels to be detected corresponding to multiple ePDCCH resource sets of the same type have no intersections or have an intersection including one AL;

any of the ALs in the AL set corresponding to type D is more than or equal to a maximum AL in the AL set corresponding to type L;

the case that 2 ePDCCH resource sets are of type L is shown in the following table:

| AL set corresponding to one Localized ePDCCH resource set | AL set corresponding to another Localized ePDCCH resource set |
|---|---|
| 1, 2, 4 | 8 |
| 1, 2 | 4, 8 |
| 1, 2, 4 | 4, 8 |
| 1 | 2, 4, 8 |
| 1, 2, 4 | 2, 4, 8 |
| 2, 4, 8 | 16 |
| 2, 4 | 8, 16 |
| 2, 4, 8 | 8, 16 |
| 2 | 4, 8, 16 |
| 2, 4, 8 | 4, 8, 16 | the case that 2 ePDCCH resource sets are of type D is shown in the following table:

| AL set corresponding to one Localized ePDCCH resource set | AL set corresponding to another Localized ePDCCH resource set |
|---|---|
| 1, 2, 4, 8 | 16 |
| 1, 2, 4 | 8, 16 |
| 1, 2 | 4, 8, 16 |
| 1 | 2, 4, 8, 16 |
| 1, 2, 4 | 4, 8, 16 |
| 1, 2, 4, 8 | 8, 16 |
| 1, 2, 4, 8 | 4, 8, 16 |
| 1, 2, 4, 8 | 2, 4, 8, 16 |
| 2, 4, 8, 16 | 32 |

-continued

| AL set corresponding to one Localized ePDCCH resource set | AL set corresponding to another Localized ePDCCH resource set |
|---|---|
| 2, 4, 8 | 16, 32 |
| 2, 4 | 8, 16, 32 |
| 2 | 4, 8, 16, 32 |
| 2, 4, 8 | 8, 16, 32 |
| 2, 4, 8, 16 | 16, 32 |
| 2, 4, 8, 16 | 8, 16, 32 |
| 2, 4, 8, 16 | 4, 8, 16, 32. |

4. The method according to claim 1, wherein: when X(i) is determined according to several of said (a) to (g), X(i) is determined according to at least the number N of the PRB pairs corresponding to Set i and the number of eREGs included in the eCCE; or X(i) is determined according to at least the value of the number N of the PRB pairs corresponding to Set i and the number of eREGs included in the eCCE; or X(i) is determined according to at least the type of the ePDCCH transmission of Set i and the number of eREGs included in the eCCE; or X(i) is determined according to at least the PRB indexes of the PRB pairs included in Set i and the number of eREGs included in the eCCE; or X(i) is determined according to at least the aggregation level configuration signaling of the base station and the number of eREGs included in the eCCE; or X(i) is determined according to at least the type of the ePDCCH transmission of Set i, K value and index i of the ePDCCH resource set and the number of eREGs included in the eCCE; or X(i) is determined according to at least K value and index i of the ePDCCH resource set and the number of eREGs included in the eCCE; or X(i) is determined according to at least N value corresponding to Set i and the ePDCCH transmission type of Set i; or X(i) is determined according to at least N value corresponding to Set i and the PRB indexes of the PRB pairs included in Set i; or X(i) is determined according to at least N value corresponding to Set i and the aggregation level configuration signaling of the base station with respect to the ePDCCH resource set; or X(i) is determined according to at least N value corresponding to Set i, the ePDCCH transmission type of K ePDCCH resource sets, K value and index i; or X(i) is determined according to at least N value corresponding to Set i, the ePDCCH transmission type of K ePDCCH resource sets, and index i; or X(i) is determined according to at least N value corresponding to Set i, K value and index i; or X(i) is determined according to at least N value corresponding to Set i, K value and index i, and the ePDCCH transmission type of Set i and the PRB indexes of the PRB pairs included in Set i; or X(i) is determined according to at least N value corresponding to Set i, K value and index i, and the ePDCCH transmission type of Set i and the aggregation level configuration signaling of the base station with respect to the ePDCCH resource set; or X(i) is determined according to at least the ePDCCH transmission type of K ePDCCH resource sets, index i, the ePDCCH transmission type of Set i and the aggregation level configuration signaling of the base station with respect to the ePDCCH resource set; or X(i) is determined according to at least the ePDCCH transmission type of Set i, index i and K value; or X(i) is determined according to at least the aggregation level configuration signaling of the base station with respect to the ePDCCH resource set, the PRB indexes of the PRB pairs included in Set i; or X(i) is determined according to at least the PRB indexes of the PRB pairs included in Set i, index i and the ePDCCH transmission type of K ePDCCH resource sets; or X(i) is determined according to at least the PRB indexes of the PRB pairs included in Set i, K value and index i; or X(i) is determined according to at least the aggregation level configuration signaling of the base station with respect to the ePDCCH resource set, the ePDCCH transmission type of K ePDCCH resource sets; or X(i) is determined according to at least the aggregation level configuration signaling of the base station with respect to the ePDCCH resource set, K value and index i; or X(i) is determined according to at least the value of the number N of the PRB pairs corresponding to Set i, the ePDCCH transmission type of Set i and the PRB indexes of the PRB pairs included in Set i; or X(i) is determined according to at least the value of the number N of the PRB pairs corresponding to Set i, the ePDCCH transmission type of Set i and the aggregation level configuration signaling of the base station with respect to the ePDCCH resource set; or X(i) is determined according to at least the value of the number N of the PRB pairs corresponding to Set i, the ePDCCH transmission type of Set i and K value and index i; or X(i) is determined according to at least the value of the number N of the PRB pairs corresponding to Set i, the ePDCCH transmission type of Set i and the ePDCCH transmission type of K ePDCCH resource sets and index i; or X(i) is determined according to at least the value of the number N of the PRB pairs corresponding to Set i, the ePDCCH transmission type of Set i and the PRB indexes of the PRB pairs included in Set i; or X(i) is determined according to at least the value of the number N of the PRB pairs corresponding to Set i, the ePDCCH transmission type of Set i, the PRB indexes of the PRB pairs included in Set i, and the aggregation level configuration signaling of the base station with respect to the ePDCCH resource set; or X(i) is determined according to at least the value of the number N of the PRB pairs corresponding to Set i, the ePDCCH transmission type of Set i, the PRB indexes of the PRB pairs included in Set i, the ePDCCH transmission type of K ePDCCH resource sets and index i; or X(i) is determined according to at least the value of the number N of the PRB pairs corresponding to Set i, the ePDCCH transmission type of Set i, the PRB indexes of the PRB pairs included in Set i, K value and index i; or X(i) is determined according to at least the value of the number N of the PRB pairs corresponding to Set i, the ePDCCH transmission type of Set i, the PRB indexes of the PRB pairs included in Set i, the aggregation level configuration signaling of the base station with respect to the ePDCCH resource set, K value and index i; or X(i) is determined according to at least the value of the number N of the PRB pairs corresponding to Set i, the ePDCCH transmission type of Set i, the PRB indexes of the PRB pairs included in Set i, the ePDCCH transmission type of K ePDCCH resource sets, K value and index i; or X(i) is determined according to at least the value of the number N of the PRB pairs corresponding to Set i, the ePDCCH transmission type of Set i, the PRB indexes of the PRB pairs included in Set i, the aggregation level configuration signaling of the base station with respect to the ePDCCH resource set, the ePDCCH transmission type of K ePDCCH resource sets, K value and index i.

5. The method according to claim 1, wherein:

when X(i) is determined, the number of eREGs included in the eCCE is taken into account; or when X(i) is determined, a Downlink Control Information (DCI) Format to be detected is taken into account; or when X(i) is determined, the type of the subframe and/or one of the following are taken into account to make a determination: a coding rate corresponding to the DCI Format to be detected transmitted in the subframe (S), the number of Resource Elements (REs) available for transmitting the ePDCCH in the PRB pair in the subframe (S), and the number of REs available for transmitting the ePDCCH in the eCCE in the subframe (S).

6. A device for detecting control signaling comprising a non-transitory computer storage medium and a processor, wherein the device is configured to:

receive, from a base station, a subframe (S); in the subframe (S), detect the control signaling in K enhanced Physical Downlink Control Channel (ePD-CCH) resource sets; detect set X(i) of aggregation level of the resource in Set i of the K ePDCCH resource sets, wherein K is an integer greater than or equal to 1, i is an integer, $0 < i <= K$, wherein X(i) is determined according to at least one of the following:

(a) number N of Physical Resource Block (PRB) pairs corresponding to Set i;
(b) type of Set i;
(c) the PRB indexes of the PRB pairs included in Set i;
(d) aggregation level configuration signaling of the base station with respect to the ePDCCH resource set;
(e) ePDCCH transmission type of ePDCCH resource set;
(f) K value and an index i of the ePDCCH resource set; and
(g) number of enhanced Resource Element Group (eREG) included in an enhanced Control Channel Element (eCCE).

7. The device according to claim 6, wherein:

when K is an integer of more than 1, in the subframe (S), X(i) is consecutive partial or full ALs in all of available ALs corresponding to the type of Set i, and at least one X(i) is the consecutive partial ALs in all of available AL sets;

in the subframe (S), the available AL set corresponding to the ePDCCH resource set of a Localized type is {1, 2, 4}, and the available AL set corresponding to the ePDCCH resource set of a Distributed type is {1, 2, 4, 8};

or, in the subframe (S), the available AL set corresponding to the ePDCCH resource set of the Localized type is {1, 2, 4, 8}, and the available AL set corresponding to the ePDCCH resource set of the Distributed type is {1, 2, 4, 8, 16};

or, in the subframe (S), the available AL set corresponding to the ePDCCH resource set of the Localized type is {2, 4, 8}, and the available AL set corresponding to the ePDCCH resource set of the Distributed type is {2, 4, 8, 16};

or, in the subframe (S), the available AL set corresponding to the ePDCCH resource set of the Localized type is {2, 4, 8, 16}, and the available AL set corresponding to the ePDCCH resource set of the Distributed type is {2, 4, 8, 16, 32};

the aggregation level sets to be detected corresponding to multiple Sets have no intersections or have intersections including one AL or intersections including 2 ALs;

the AL set corresponding to Set is as shown in the following table:

| AL sets corresponding to all Localized transmissions | AL sets corresponding to all Distributed transmissions |
|---|---|
| 1, 2, 4 | 8 |
| 1, 2, | 4, 8 |
| 2, 4 | 8, 16 |
| 2, 4, 8 | 16 |
| 1, 2, 4 | 8, 16 |
| 1, 2, | 4, 8, 16 |
| 2, 4, 8 | 16, 32 |
| 2, 4, | 8, 16, 32 |
| 1, 2, 4 | 4, 8 |
| 1, 2, 4 | 2, 4, 8 |
| 1, 2, | 2, 4, 8 |
| 2, 4 | 4, 8, 16 |
| 2, 4, 8 | 8, 16 |
| 2, 4, 8 | 4, 8, 16 |
| 1, 2, 4 | 8, 16 |
| 1, 2, | 4, 8, 16 |
| 1, 2, 4 | 4, 8, 16 |
| 2, 4, 8 | 16, 32 |
| 2, 4, 8 | 8, 16, 32 |
| 2, 4, | 8, 16, 32 |
| 2, 4, 8, 16 | 32 |
| 2, 4, 8, 16 | 16, 32 |
| 2, 4, 8, 16 | 8, 16, 32. |

8. The device according to claim 6, wherein:

when K is an integer of more than 1, and ePDCCH resource sets of a same type exist, the aggregation levels to be detected corresponding to multiple ePD-CCH resource sets of the ePDCCH transmission type in the same ePDCCH resource set are different;

the aggregation levels to be detected corresponding to multiple ePDCCH resource sets of the same type have no intersections or have an intersection including one AL;

any of the aggregation levels in the AL set corresponding to type D is more than or equal to a maximum aggregation level in the AL set corresponding to type L;

the case that 2 ePDCCH resource sets are of type L is as shown in the following table:

| AL set corresponding to one Localized ePDCCH resource set | AL set corresponding to another Localized ePDCCH resource set |
|---|---|
| 1, 2, 4 | 8 |
| 1, 2 | 4, 8 |
| 1, 2, 4 | 4, 8 |
| 1 | 2, 4, 8 |
| 1, 2, 4 | 2, 4, 8 |
| 2, 4, 8 | 16 |
| 2, 4 | 8, 16 |
| 2, 4, 8 | 8, 16 |
| 2 | 4, 8, 16 |
| 2, 4, 8 | 4, 8, 16 | the case that 2 ePDCCH resource sets are of type D is as shown in the following table:

| AL set corresponding to one Localized ePDCCH resource set | AL set corresponding to another Localized ePDCCH resource set |
|---|---|
| 1, 2, 4, 8 | 16 |
| 1, 2, 4 | 8, 16 |
| 1, 2 | 4, 8, 16 |
| 1 | 2, 4, 8, 16 |
| 1, 2, 4 | 4, 8, 16 |
| 1, 2, 4, 8 | 8, 16 |
| 1, 2, 4, 8 | 4, 8, 16 |
| 1, 2, 4, 8 | 2, 4, 8, 16 |
| 2, 4, 8, 16 | 32 |
| 2, 4, 8 | 16, 32 |
| 2, 4 | 8, 16, 32 |
| 2 | 4, 8, 16, 32 |
| 2, 4, 8 | 8, 16, 32 |
| 2, 4, 8, 16 | 16, 32 |
| 2, 4, 8, 16 | 8, 16, 32 |
| 2, 4, 8, 16 | 4, 8, 16, 32. |

9. The device according to claim 6, wherein when X(i) is determined according to several of (a) to (g), the device is configured to:
determine X(i) according to at least the number N of the PRB pairs corresponding to Set i and the number of eREGs included in the eCCE; or
determine X(i) according to at least the value of the number N of the PRB pairs corresponding to Set i and the number of eREGs included in the eCCE; or
determine X(i) according to at least the type of the ePDCCH transmission of Set i and the number of eREGs included in the eCCE; or
determine X(i) according to at least the PRB indexes of the PRB pairs included in Set i and the number of eREGs included in the eCCE; or
determine X(i) according to at least the aggregation level configuration signaling of the base station and the number of eREGs included in the eCCE; or
determine X(i) according to at least the type of the ePDCCH transmission of Set i, K value and index i of the ePDCCH resource set and the number of eREGs included in the eCCE; or
determine X(i) according to at least K value and index i of the ePDCCH resource set and the number of eREGs included in the eCCE; or
determine X(i) according to at least N value corresponding to Set i and the ePDCCH transmission type of Set i; or
determine X(i) according to at least N value corresponding to Set i and the PRB indexes of the PRB pairs included in Set i; or
determine X(i) according to at least N value corresponding to Set i and the aggregation level configuration signaling of the base station with respect to the ePDCCH resource set; or
determine X(i) according to at least N value corresponding to Set i, the ePDCCH transmission type of K ePDCCH resource sets, K value and index i; or
determine X(i) according to at least N value corresponding to Set i, the ePDCCH transmission type of K ePDCCH resource sets, and index i; or
determine X(i) according to at least N value corresponding to Set i, K value and index i; or
determine X(i) according to at least N value corresponding to Set i, K value and index i, and the ePDCCH transmission type of Set i and the PRB indexes of the PRB pairs included in Set i; or
determine X(i) according to at least N value corresponding to Set i, K value and index i, and the ePDCCH transmission type of Set i and the aggregation level configuration signaling of the base station with respect to the ePDCCH resource set; or
determine X(i) according to at least the ePDCCH transmission type of K ePDCCH resource sets, index i, the ePDCCH transmission type of Set i and the aggregation level configuration signaling of the base station with respect to the ePDCCH resource set; or
determine X(i) according to at least the ePDCCH transmission type of Set i, index i and K value; or
determine X(i) according to at least the aggregation level configuration signaling of the base station with respect to the ePDCCH resource set, the PRB indexes of the PRB pairs included in Set i; or
determine X(i) according to at least the PRB indexes of the PRB pairs included in Set i, index i and the ePDCCH transmission type of K ePDCCH resource sets; or
determine X(i) according to at least the PRB indexes of the PRB pairs included in Set i, K value and index i; or
determine X(i) according to at least the aggregation level configuration signaling of the base station with respect to the ePDCCH resource set, the ePDCCH transmission type of K ePDCCH resource sets; or
determine X(i) according to at least the aggregation level configuration signaling of the base station with respect to the ePDCCH resource set, K value and index i; or
determine X(i) according to at least the value of the number N of the PRB pairs corresponding to Set i, the ePDCCH transmission type of Set i and the PRB indexes of the PRB pairs included in Set i; or
determine X(i) according to at least the value of the number N of the PRB pairs corresponding to Set i, the ePDCCH transmission type of Set i and the aggregation level configuration signaling of the base station with respect to the ePDCCH resource set; or
determine X(i) according to at least the value of the number N of the PRB pairs corresponding to Set i, the ePDCCH transmission type of Set i and K value and index i; or
determine X(i) according to at least the value of the number N of the PRB pairs corresponding to Set i, the ePDCCH transmission type of Set i and the ePDCCH transmission type of K ePDCCH resource sets and index i; or determine X(i) according to at least the value of the number N of the PRB pairs corresponding to Set i, the ePDCCH transmission type of Set i and the PRB indexes of the PRB pairs included in Set i; or determine X(i) according to at least the value of the number N of the PRB pairs corresponding to Set i, the ePDCCH transmission type of Set i, the PRB indexes of the PRB pairs included in Set i, and the aggregation level configuration signaling of the base station with respect to the ePDCCH resource set; or determine X(i) according to at least the value of the number N of the PRB pairs corresponding to Set i, the ePDCCH transmission type of Set i, the PRB indexes of the PRB pairs included in Set i, the ePDCCH transmission type of K ePDCCH resource sets and index i; or determine X(i) according to at least the value of the number N of the PRB pairs corresponding to Set i, the ePDCCH transmission type of Set i, the PRB indexes of the PRB pairs included in Set i, K value and index i; or determine X(i) according to at least the value of the number N of the PRB pairs corresponding to Set i, the ePDCCH transmission type of Set i, the PRB indexes of the PRB pairs included in Set i, the aggregation level configuration signaling of the base station with respect to the ePDCCH resource set, K value and index i; or determine X(i) according to at least the value of the number N of the PRB pairs corresponding to Set i, the ePDCCH transmission type of Set i, the PRB indexes of the PRB pairs included in Set i, the ePDCCH transmission type of K ePDCCH resource sets, K value and index i; or determine X(i) according to at least the value of the number N of the PRB pairs corresponding to Set i, the ePDCCH transmission type of Set i, the PRB indexes of the PRB pairs included in Set i, the aggregation level configuration signaling of the base station with respect to the ePDCCH resource set, the ePDCCH transmission type of K ePDCCH resource sets, K value and index i.

10. The device according to claim 6, wherein the device is configured to:
when X(i) is determined, take into account the number of eREGs included in the eCCE; or
when X(i) is determined, take into account a Downlink Control Information (DCI) Format to be detected; or
when X(i) is determined, take into account the type of the subframe and/or one of the following three items to make a determination: a coding rate corresponding to the DCI Format to be detected transmitted in the subframe (S), the number of Resource Elements (REs) available for transmitting the ePDCCH in the PRB pair in the subframe (S), and the number of REs available for transmitting the ePDCCH in the eCCE in the subframe (S).

11. The device according to claim 6, wherein the device is a terminal.

12. A method for implementing control signaling detection, comprising:
notifying, by a base station, a terminal of information of aggregation levels (ALs) to be detected corresponding to K ePDCCH resource sets Set i through control signaling in a subframe (S), wherein
the base station performs joint encoding on K value, the number N of PRB pairs corresponding to K Sets and AL information that each Set requires to detect, and makes a notification; or
the base station performs joint encoding on K value, Distributed/Localized (D/L) type of K Sets, and the AL information that each Set requires to detect, and makes a notification; or
the base station performs joint encoding on K value, D/L type of K Sets, the number N of PRB pairs corresponding to K Sets, and the AL information that each Set requires to detect, and makes a notification.

13. The method according to claim 12, wherein there are two types of subframes S, respectively a first type of subframe and a second type of subframe, the notification is made independently with respect to the two types of subframes; the first type of subframe is a subframe including 4 eREGs in one eCCE; the second type of subframe is a subframe including 8 eREGs in one eCCE.

14. The method according to claim 12, further comprising:
performing, by the base station, joint encoding on the value of the number N of PRB pairs corresponding to Set i and AL information to be detected, and making a notification; or
performing, by the base station, joint encoding on the D/L type of Set i and the AL information to be detected, and making a notification; or
performing, by the base station, joint encoding on the D/L type of Set i, the value of the number N of PRB pairs corresponding to Set i and AL information to be detected, and making a notification.

15. A device for implementing control signaling detection comprising a non-transitory computer storage medium and a processor, wherein the device is configured to:
notify a terminal of information of ALs to be detected corresponding to K ePDCCH resource sets Set i through control signaling in a subframe (S),
wherein the device is configured to:
perform joint encoding on K value, the number N of PRB pairs corresponding to K Sets and AL information that each Set requires to detect, and make a notification; or
perform joint encoding on K value, Distributed/Localized (D/L) type of K Sets, and the AL information that each Set requires to detect, and make a notification; or
perform joint encoding on K value, D/L type of K Sets, the number N of PRB pairs corresponding to K Sets, and the AL information that each Set requires to detect, and makes a notification.

16. The device according to claim 15, wherein the AL to be detected is associated with the eCCE, the eCCE includes 4 eREGs or 8 eREGs.

17. The device according to claim 15, wherein the device is further configured to:
perform joint encoding on the value of a number N of PRB pairs corresponding to Set i and AL information to be detected, and make a notification; or
perform joint encoding on the D/L type of Set i and the AL information to be detected, and make a notification; or
perform joint encoding on the D/L type of Set i, the value of the number N of PRB pairs corresponding to Set i and AL information to be detected, and make a notification.

* * * * *